United States Patent
Fan et al.

(10) Patent No.: US 11,363,446 B2
(45) Date of Patent: Jun. 14, 2022

(54) PROFILE GENERATION METHOD, PROFILE ACQUISITION METHOD, AND RELATED DEVICE AND STORAGE MEDIUM

(71) Applicant: HUAWEI TECHNOLOGIES CO., LTD., Shenzhen (CN)

(72) Inventors: Shunan Fan, Beijing (CN); Shuiping Long, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 178 days.

(21) Appl. No.: 16/956,967

(22) PCT Filed: Feb. 23, 2019

(86) PCT No.: PCT/CN2019/075984
§ 371 (c)(1),
(2) Date: Jun. 22, 2020

(87) PCT Pub. No.: WO2019/165941
PCT Pub. Date: Sep. 6, 2019

(65) Prior Publication Data
US 2021/0377722 A1 Dec. 2, 2021

(30) Foreign Application Priority Data
Mar. 2, 2018 (CN) .......................... 201810175815.1

(51) Int. Cl.
*H04W 8/18* (2009.01)
*H04W 8/20* (2009.01)
(Continued)

(52) U.S. Cl.
CPC ........... *H04W 8/183* (2013.01); *H04L 67/306* (2013.01); *H04W 4/50* (2018.02); *H04W 8/205* (2013.01)

(58) Field of Classification Search
CPC ....... H04W 8/183; H04W 4/50; H04W 8/205; H04W 4/00; H04W 8/18; H04W 8/20; H04L 67/306
See application file for complete search history.

(56) References Cited

U.S. PATENT DOCUMENTS

2014/0329502 A1* 11/2014 Lee ...................... H04W 12/04
455/411
2014/0357229 A1 12/2014 Lee et al.
(Continued)

FOREIGN PATENT DOCUMENTS

CN 104396289 A 3/2015
CN 106937274 A 7/2017
(Continued)

*Primary Examiner* — Joseph E Dean, Jr.
(74) *Attorney, Agent, or Firm* — Leydig, Voit & Mayer, Ltd.

(57) ABSTRACT

If a first SIM card in a terminal device has been registered with a first service provider, when needs to subscribe to a second service provider for registration, the terminal device sends a subscription indication and a subscription identity to a second service provider server. The second service provider server acquires service registration information from a first service provider server according to the subscription indication and the subscription identity, generates a second profile for accessing a second service provider network based on the service registration information which is used by the first SIM card to access a first service provider network. The second profile is generated based on existing service registration information, so the terminal device subscribes to the second service provider for registration. After performing subscription for registration once, no need to submit an identity for verification again, user operations are simplified and user experience is improved.

20 Claims, 15 Drawing Sheets

(51) Int. Cl.
*H04W 4/50* (2018.01)
*H04L 67/306* (2022.01)

(56) References Cited

U.S. PATENT DOCUMENTS

| | | | |
|---|---|---|---|
| 2016/0057725 | A1 | 2/2016 | Suh |
| 2016/0149903 | A1 | 5/2016 | Suh |
| 2020/0322884 | A1* | 10/2020 | Di Girolamo ........ H04W 12/37 |

FOREIGN PATENT DOCUMENTS

| | | |
|---|---|---|
| CN | 107645715 A | 1/2018 |
| EP | 2741548 A2 | 6/2014 |
| KR | 20140140882 A | 12/2014 |
| WO | 2017041299 A1 | 3/2017 |
| WO | 2017087903 A1 | 5/2017 |
| WO | 2017220154 A1 | 12/2017 |

\* cited by examiner

PROFILE GENERATION METHOD, PROFILE ACQUISITION METHOD, AND RELATED DEVICE AND STORAGE MEDIUM

CROSS-REFERENCE TO RELATED APPLICATIONS

The application is a National Stage of International Patent Application No. PCT/CN2019/075984, filed on Feb. 23, 2019, which claims priority to Chinese Patent Application No. 201810175815.1, filed on Mar. 2, 2018. The disclosures of the aforementioned applications are hereby incorporated by reference in their entireties.

TECHNICAL FIELD

The present application relates to the terminal field, and in particular, to a profile generation method, a profile acquisition method, a related device, and a storage medium.

BACKGROUND

Current subscriber identity module (subscriber identity module, SIM) cards exist in three forms. A first form is a common pluggable SIM card. A second form is an embedded universal integrated circuit card (embedded universal integrated circuit card, eUICC), and may also be referred to as an eSIM (embedded SIM) card. A third form is an integrated universal integrated circuit card (integrated universal integrated circuit card, iUICC). Fixed SIM data has been burnt into the common pluggable SIM card at delivery. The common pluggable SIM card is connected to an operator network by the fixed SIM data. In addition, the SIM card and a code number resource are changed through plugging and unplugging. The eSIM card and the iUICC may download, from a mobile network operator, a profile required for connecting to the operator network.

For a terminal device which includes a plurality of SIM cards, if a SIM card in the terminal device has been registered with an operator, when a user subscribes to another operator for registration, an identity needs to be submitted again for verification. Consequently, a registration operation of the user is complex and inefficient, and user experience is affected.

SUMMARY

Embodiments of the present application provide a profile generation method, a profile acquisition method, a related device, and a storage medium. When a terminal device has been registered with a first service provider, and needs to subscribe to another service provider for registration, user operations can be simplified and user experience can be improved.

A first aspect of the present application provides a profile generation method, the method comprises: when a first subscriber identity module card in a terminal device has been registered, and the first subscriber identity module card has accessed a first service provider network based on service registration information, if the terminal device needs to access a second service provider network, the terminal device sends a subscription indication and a subscription identity to a second service provider server; the second service provider server receives the subscription indication and the subscription identity sent by the terminal device, the subscription identity includes at least one of two identifiers, the two identifiers include an identifier of the first subscriber identity module card in the terminal device and an identifier of a first profile in the first subscriber identity module card; then the second service provider server acquires the service registration information from a first service provider server according to the subscription indication and the subscription identity; and the second service provider server generates a second profile based on the service registration information, so that the terminal device may access the second service provider network by the second profile.

In this embodiment, the second profile may be generated based on existing service registration information related to a first service provider, and the terminal device subscribes to a second service provider for registration. In this way, after a user performs subscription for registration once, the user can subscribe to another service provider for registration without a need to submit an identity for verification again, so that user operations can be simplified and user experience can be improved.

Optionally, a manner, in which the second service provider server acquires the service registration information from a first service provider server according to the subscription indication and the subscription identity, may be: the second service provider server sends a registration verification request to the first service provider server according to the subscription indication, the registration verification request carries the subscription identity, the registration verification request is used by the first service provider server to verify identity information of the user; after verifying a user identity according to the subscription identity, the first service provider server sends the service registration information corresponding to the subscription identity to the second service provider server; the second service provider server receives the service registration information sent by the first service provider server, the service registration information is information sent by the first service provider server after verifying the user identity according to the subscription identity. In this manner, after verifying the subscription identity of the terminal device, the first service provider server sends the service registration information acquired when the user performs subscription to the second service provider server. This is more secure.

Optionally, the first service provider server may consider that the subscription identity sent by the terminal device is reliable, and directly sends the service registration information to the second service provider server without verifying the user identity. Specifically, the second service provider server sends a registration verification request to the first service provider server according to the subscription indication, wherein the registration verification request carries the subscription identity; the first service provider server sends the service registration information to the second service provider server, wherein the service registration information is service registration information used by a user corresponding to the subscription identity to access the first service provider network.

Optionally, the first subscriber identity module card includes a pluggable subscriber identity module SIM card, an embedded universal integrated circuit card eUICC, an integrated universal integrated circuit card iUICC, or an integrated subscriber identity module iSIM card.

A second aspect of the present application provides a profile acquisition method, a terminal device includes a first subscriber identity module card, and the first subscriber identity module card accesses a first service provider network based on service registration information, the method comprises: the terminal device sends a subscription indication and a subscription identity to a second service provider server, wherein the subscription indication is used to indicate that the second service provider server acquires the service registration information from a first service provider server according to the subscription identity, and generates a second profile based on the service registration information; and the terminal device receives the second profile, and may access a second service provider network by the second profile.

In this embodiment, the second profile may be generated based on existing service registration information related to a first service provider, so that the terminal device subscribes to a second service provider for registration. In this way, after a user performs subscription for registration once, the user can subscribe to the second service provider for registration without a need to submit an identity for verification again, so that user operations can be simplified and user experience can be improved.

Optionally, the method further comprises: after sending a subscription indication and a subscription identity to the second service provider server, the terminal device receives a verification request message sent by the first service provider server, wherein the verification request message is a request message sent by the first service provider to the terminal device after the first service provider receives a registration verification request sent by the second service provider, and the request message is used by the first service provider server to verify the subscription identity of the terminal device. Then, the terminal device sends a verification response message to the first service provider server. The verification response message is used by the first service provider server to send the service registration information to the second service provider server, after verification on a user identity succeeds according to the verification response message.

Optionally, the verification request message includes verification information, the verification response message may also include the verification information, and the verification information may be a verification code.

In this embodiment, after verifying the subscription identity of the terminal device, the first service provider server sends the service registration information to the second service provider server, wherein the service registration information is acquired when the user performs subscription. This is more secure.

Optionally, the method further includes: after the terminal device sends a subscription indication and a subscription identity to a second service provider server, the terminal device receives a verification request message sent by the first service provider server, wherein the verification request message is a request message sent by the first service provider to the terminal device after the first service provider receives a registration verification request sent by the second service provider, and the request message is used by the first service provider server to verify the subscription identity of the terminal device. Then, the terminal device sends a verification response message to the first service provider server by the second service provider server. The verification response message is used by the first service provider server to send the service registration information to the second service provider server, after verification performed by the first service provider server on a user identity succeeds according to the verification response message.

Optionally, the verification request message includes verification information, the verification response message may also include the verification information, and the verification information may be a verification code.

Likewise, in this implementation, after verifying the subscription identity of the terminal device, the first service provider server sends the service registration information to the second service provider server, and the service registration information is acquired when the user performs subscription. This is more secure.

Optionally, when the subscription indication is a first subscriber identity module card upgrading indication, after the terminal device receives the second profile, the method further comprises: the terminal device installs and activates the second profile, and disables the first subscriber identity module card. In this implementation solution, after the subscriber identity module card is upgraded, the terminal device no longer supplies power to the first subscriber identity module card, so as to reduce power consumption and resources of the terminal device, and may prevent the terminal device from activating the original first subscriber identity module card when the first subscriber identity module card is not disabled.

In an implementation, in addition to the first subscriber identity module card, the terminal device further includes a second subscriber identity module card. The second subscriber identity module card is an embedded universal integrated circuit card eUICC, an integrated universal integrated circuit card iUICC or an iSIM card, and the first subscriber identity module card is a pluggable subscriber identity module SIM card. Before the terminal device sends a subscription identity to a second service provider server, the method further comprises: the terminal device acquires the subscription identity, wherein the subscription identity is an identifier of the pluggable SIM card; and after the terminal device receives the second profile, the method further comprises: the terminal device installs the second profile in the second subscriber identity module card.

In another implementation, the first subscriber identity module card is a eUICC, an iUICC, or an iSIM card; Before the terminal device sends a subscription identity to a second service provider server, the method further includes: the terminal device acquires the subscription identity, wherein the subscription identity includes at least one of two identifiers, the two identifiers include an identifier of the first subscriber identity module card and an identifier of a first profile in the first subscriber identity module card. After the terminal device receives the second profile, the method further comprises: the terminal device installs the second profile in the first subscriber identity module card.

In another implementation, the first subscriber identity module card is a eUICC, an iUICC, or an iSIM card. The terminal device further includes a second subscriber identity module card, and the second subscriber identity module card is a eUICC or an iUICC. Before the terminal device sends a subscription identity to a second service provider server, the method further comprises: the terminal device acquires the subscription identity, wherein the subscription identity includes at least one of an identifier of two identifiers, the two identifiers include the first subscriber identity module card and an identifier of a first profile in the first subscriber identity module card. After the terminal device receives the second profile, the method further includes: the terminal device installs the second profile in the second subscriber identity module card.

A third aspect of the present application further provides a profile acquisition method. The method is performed by a local profile assistant (local profile assistant, LPA) in a terminal device. The method includes: the LPA sends a subscription indication and a subscription identity to a second service provider server, wherein the subscription indication is used to indicate that the second service provider server acquires service registration information from a first service provider server according to the subscription identity, the service registration information is information used by a first subscriber identity module card to access a first service provider network, and generates a second profile based on the service registration information; and the LPA receives the second profile, wherein the second profile is used by the terminal device to access a second service provider network.

In this embodiment, the LPA sends the subscription indication and the subscription identity to the second service provider server. Therefore, the second service provider server may generate the second profile based on existing service registration information related to a first service provider, so that the terminal device subscribes to a second service provider for registration. In this way, after a user performs subscription for registration once, the user can subscribe to the second service provider for registration without a need to submit an identity for verification again, so that user operations can be simplified and user experience can be improved.

Optionally, the subscription indication may be a request initiated by a service provider application. Before the LPA sends a subscription indication and a subscription identity to a second service provider server, the method further includes: the LPA receives the subscription indication sent by a second service provider application; and acquires the subscription identity according to the subscription indication.

Optionally, when the subscription indication is the request initiated by the service provider application, a process in which the LPA sends a subscription indication and a subscription identity to a second service provider server may be: the LPA sends the subscription indication and the subscription identity to the second service provider server through the second service provider application.

Optionally, the method further includes: after the LPA sends a subscription indication and a subscription identity to a second service provider server, the LPA acquires a verification response message, wherein the verification response message is a response of the first subscriber identity module card to a verification request message received from the first service provider server; then the LPA sends the verification response message to the second service provider server through the second service provider application, wherein the verification response message is used by the first service provider server to send the service registration information to the second service provider server, after the first service provider server receives the verification response message from the second service provider server and verifies the verification response message.

In an implementation, when the subscription indication is a first subscriber identity module card upgrading indication, after the LPA receives the second profile, the method further comprises: the LPA installs and activates the second profile, and disables the first subscriber identity module card. Therefore, after the first subscriber identity module card is upgraded, the terminal device no longer supplies power to the first subscriber identity module card, so as to reduce power consumption and resources of the terminal device, and may prevent the terminal device from activating the original first subscriber identity module card when the first subscriber identity module card is not disabled.

Optionally, the first subscriber identity module card may be a pluggable subscriber identity module SIM card, an embedded universal integrated circuit card eUICC, or an integrated universal integrated circuit card iUICC, or may be an iSIM card.

A fourth aspect of the present application further provides a server. A specific implementation corresponds to a function in the profile generation method provided in the first aspect. The function may be implemented by hardware, or may be implemented by hardware executing a corresponding software program. The hardware and software include one or more unit modules corresponding to the function. The unit module may be software and/or hardware.

In a possible design, the server includes: a receiving module, configured to receive a subscription indication and a subscription identity that are sent by a terminal device, wherein the subscription identity includes at least one of two identifiers, the two identifiers include an identifier of a first subscriber identity module card in the terminal device and an identifier of a first profile in the first subscriber identity module card, and the first subscriber identity module card accesses a first service provider network based on service registration information; an acquisition module, configured to acquire the service registration information from a first service provider server according to the subscription indication and the subscription identity; and a generation module, configured to generate a second profile based on the service registration information, wherein the second profile is used by the terminal device to access a second service provider network.

In addition, each of the unit modules in the server further performs all or some of steps performed by the second service provider server in the profile generation method provided in the first aspect.

In another possible design, the server comprises a memory, one or more processors, and one or more programs, wherein the one or more programs are stored in the memory, and the processor executes the one or more programs to perform all or some steps performed by the second service provider server in the method provided in the first aspect.

A fifth aspect of the present application further provides a terminal device. A specific implementation corresponds to a function in the profile acquisition method provided in the second aspect. The function may be implemented by hardware, or may be implemented by hardware executing a corresponding software program. The hardware and software include one or more unit modules corresponding to the function. The unit module may be software and/or hardware.

In a possible design, the terminal device comprises: a sending module, configured to send a subscription indication and a subscription identity to a second service provider server, wherein the subscription indication is used to indicate that the second service provider server acquires service registration information from a first service provider server according to the subscription identity, and generates a second profile based on the service registration information, wherein the second profile is used by the terminal device to access a second service provider network; and a receiving module, configured to receive the second profile.

In addition, each of the unit modules in the terminal device further performs all or some of steps performed by the terminal device in the profile acquisition method provided in the second aspect.

In another possible design, the terminal device comprises a memory, one or more processors, and one or more programs, wherein the one or more programs are stored in the memory, and the processor executes the one or more programs to perform all or some steps performed by the terminal device in the method provided in the second aspect.

A sixth aspect of the present application further provides a local profile assistant apparatus. A specific implementation corresponds to a function in the profile acquisition method provided in the third aspect. The function may be implemented by hardware, or may be implemented by hardware executing a corresponding software program. The hardware and software include one or more unit modules corresponding to the function. The unit module may be software and/or hardware.

In a possible design, the local profile assistant apparatus includes: a sending module, configured to send a subscription indication and a subscription identity to a second service provider server, wherein the subscription indication is used to indicate that the second service provider server acquires service registration information from a first service provider server according to the subscription identity, the service registration information is used by a first subscriber identity module card to access a first service provider network, and generates a second profile based on the service registration information, wherein the second profile is used by a terminal device to access a second service provider network; and a receiving module, configured to receive the second profile.

In addition, each of the unit modules in the local profile assistant apparatus further performs all or some of steps performed by the LPA in the profile acquisition method provided in the third aspect.

In another possible design, the local profile assistant apparatus comprises a memory, one or more processors, and one or more programs. The one or more programs are stored in the memory, and the processor executes the one or more programs to perform all or some steps performed by the LPA in the method provided in the third aspect.

A seventh aspect of the present application provides a computer-readable storage medium, the computer-readable storage medium stores instructions, and when the instructions are run on a computer, the computer is enabled to perform the method according to any one of the first to the third aspects.

An eighth aspect of the present application provides a computer program product or a computer program including instructions, when the computer program product or the computer program is run on a computer, the computer is enabled to perform the method according to any one of the first to the third aspects.

A ninth aspect of the present application provides a communication apparatus, the communication apparatus may be, for example, a chip. The communication apparatus may be disposed in a terminal device. The communication apparatus comprises a processing module and an interface module. The processing module may be a processor, the processor is configured to support the communication apparatus in performing the method according to any one of the first to the third aspects. The interface module may be a communication interface, and the communication interface is configured to support communication between the communication apparatus and another communication apparatus or another network element. The communication apparatus may further comprise a storage module. The storage module may be a memory. The memory is coupled to the processor, and is configured to store program instructions and data that are necessary for the communication apparatus.

A tenth aspect of the present application provides a system, the system comprises the server of the fourth aspect and the terminal device of the fifth aspect.

In conclusion, in the embodiments of the present application, if a subscriber identity module card (the first subscriber identity module card) in the terminal device has been registered with the first service provider, when the user needs to subscribe to the second service provider for registration, the terminal device sends the subscription indication and the subscription identity to the second service provider server, wherein the subscription identity may include at least one of two identifiers, the two identifiers include an identifier of the first subscriber identity module card in the terminal device and an identifier of the first profile in the first subscriber identity module card. Then, the second service provider server acquires the service registration information from the first service provider server according to the subscription indication and the subscription identity, wherein the service registration information is information used by the first subscriber identity module card to access the first service provider network, and the second service provider server generates the second profile for accessing the second service provider network, based on the service registration information. In the embodiments, the second profile may be generated based on existing service registration information related to the first service provider, so that the terminal device subscribes to the second service provider for registration. In this way, after the user performs subscription for registration once, the user can subscribe to another service provider for registration without a need to submit an identity for verification again, so that user operations can be simplified and user experience can be improved.

DESCRIPTION OF EMBODIMENTS

The following further describes in detail the embodiments of the present application with reference to the accompanying drawings.

The embodiments of the present application are applied to a scenario in which a subscriber identity module card in a terminal device has been registered with a first service provider and a user needs to subscribe to another service provider (a second service provider) for registration.

Figure 1:
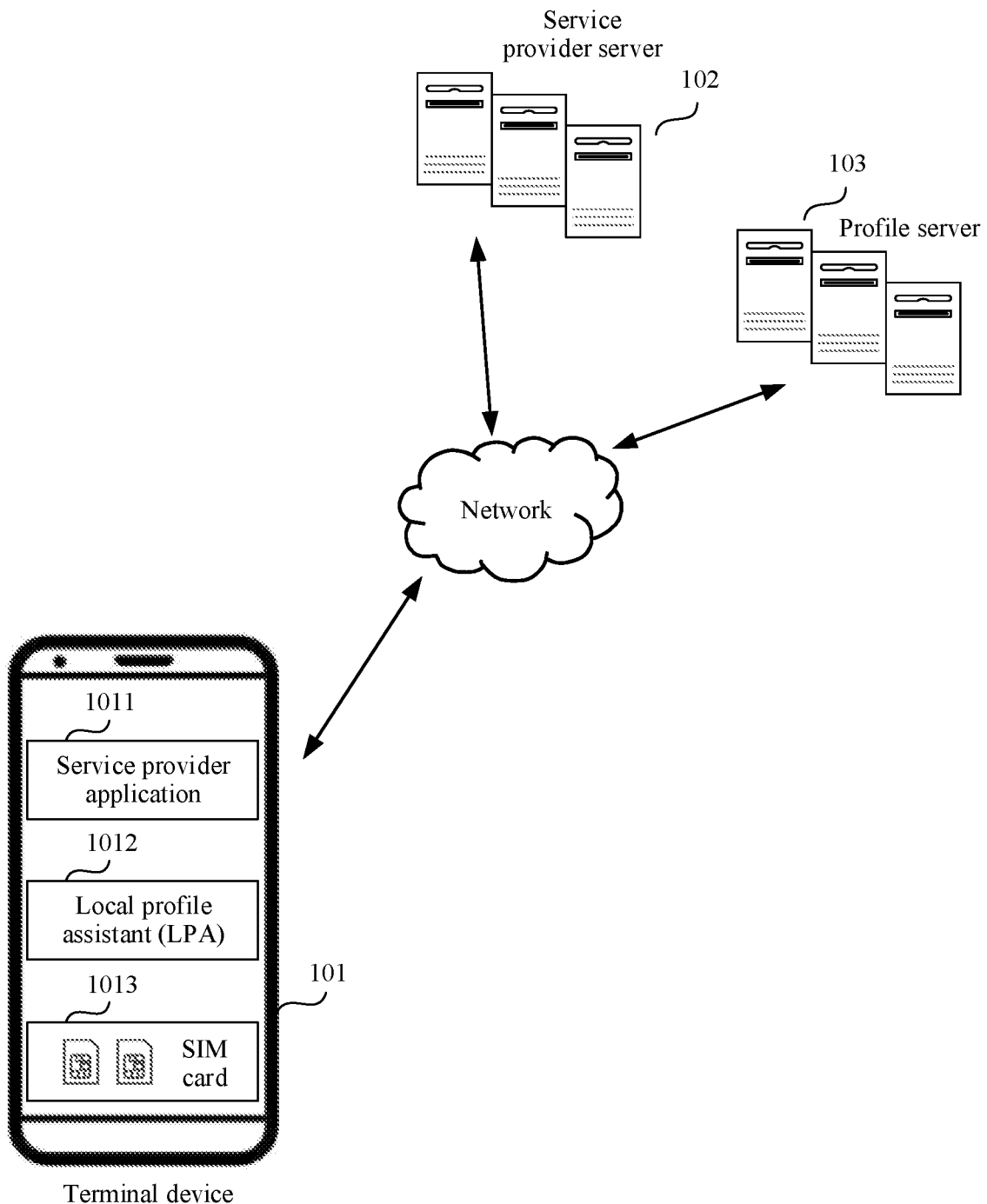
FIG. 1 is a schematic diagram of an information exchange between a terminal device and a network side according to an embodiment of the present application.

When subscription is performed for registration, as shown in FIG. 1, a terminal device 101 exchanges information with servers such as a service provider server 102 and a profile server 103 by a network. The terminal device (briefly referred to as a terminal) may include user equipment, an internet of vehicles device, a wearable device, an internet of things device, a smart robot device, or the like that exists in various forms, for example, a device such as a mobile phone, a tablet, a smart watch, a vehicle-mounted terminal, a smart water meter, or a smart electricity meter. The terminal device includes software and hardware modules such as a SIM card 1013, a local configuration agent or a local profile assistant (local profile assistant, LPA) module 1012, and a service provider application 1011. Functions of entities and modules in FIG. 1 are described as follows:

The SIM card in the terminal device may include a common pluggable SIM card, a eUICC, an iUICC, an integrated subscriber identity module (integrated subscriber identity module, iSIM) card, or a subscriber identity module card in another form.

The common pluggable SIM card is a subscriber identity module (subscriber identity module, SIM) card, and is usually referred to as a SIM card. The common pluggable SIM card is a smart card that is mainly configured to store user identity data, SMS data and a phone number, and is a SIM card that complies with the 7816 standard of European telecommunications standards institute (European telecommunications standards institute, ETSI) and international organization for standardization (international organization for standardization, ISO). The common pluggable SIM card is usually a SIM card purchased by a user from a telecommunication operator, and fixed SIM data has been burnt into the SIM card at delivery. After the SIM card is disposed in the terminal, the user has right to use a communication service provided by the operator. The SIM card and a code number resource may be changed through plugging and unplugging. The terminal communicates with the SIM card through an ISO protocols.

The eUICC may also be referred to as an eSIM card, and is a secure element that can be used by a plurality of telecommunication operators to remotely manage a subscriber. The eUICC may be disposed in the terminal in two manners: a plug-in manner or a welding manner. The user may randomly download a profile required for connecting to an operator, and use a profile in the eUICC to access a selected operator network. The eUICC interacts with the terminal by an ISO protocol and a 7816 interface protocol that is related to an IC card.

The iUICC is integrated into a mobile phone chip in an IP manner or a chip stacking manner. The user may randomly download a profile required for connecting to an operator, and use a profile in the iUICC to access a selected operator network. Because the iUICC is integrated into a system on chip (system on chip, SoC), not limited to using the 7816 interface protocol, a larger file can be transferred between the terminal and the iUICC at a higher speed, physical space of the terminal can be further saved, and power consumption and costs of the terminal can be reduced.

The iSIM card is acquired by integrating a SIM card into a processor of a device, and this is referred to as an iSIM technology. Compared with an eSIM technology, no independent chip is used in the iSIM. Instead, SIM card information is embedded in the processor of the device, to reduce dependency on Wi-Fi, and access a network anytime and anywhere. This technology is mainly developed for a small-sized internet of things device, to reduce costs required for production.

The LPA may be used to: perform profile download and management, perform service discovery, provide a UI (for example, a profile installation list) for the user, and the like, so that the user can manage a local profile in the eUICC (for example, perform an operation such as activation, deactivation, deletion, or unlocking on the profile). In addition, the terminal device may further retrieve a eUICC identifier (eUICC identifier, EID) and/or an integrated circuit card identifier (integrated circuit card ID, ICCID) by a LPA. The LPA may be a virtual logical module, or may be a physical module, for example, a field programmable gate array. The LPA includes a local discovery service (local discovery service, LDS), local profile download (local profile download, LPD), and local user interface UI (local user interface, LUI). The LPA in the user equipment and eUICC may include any one or more of the LDS, the LPD, and the LUI.

A service provider may be a basic operator, for example, an operator such as China Mobile, China Unicom, or France Telecom. Alternatively, a terminal vendor may serve as a service provider; a card vendor may serve as a service provider; an enterprise may serve as a service provider; or a virtual operator may serve as a service provider.

The service provider application (application, APP) may be a software application that is installed on the terminal and that is used by the service provider to provide a service. For example, a handheld business hall application of an operator, an access portal that is of a web page server for subscription and that is opened by the user by a browser to access an operator network, a system-level application of a terminal vendor, or an enterprise application provided by an enterprise.

The service provider server is a server that is deployed by the service provider and that provides a wireless communication service, for example, a mobile network operator (mobile network operator, MNO) server, a service platform server provided by a terminal vendor for a brand terminal of the terminal vendor, or a service platform server provided by an enterprise for a user of the enterprise.

Service providers in the embodiments of the present application include a first service provider and a second service provider. The first service provider and the second service provider may be different service providers, for example, China Mobile and China Unicom, or for another example, a vendor A that provides a wireless communication registration service and a vendor B that provides a wireless communication registration service. In addition, the first service provider and the second service provider may also alternatively be different sub-brands of the same service provider, for example, a sub-brand "M-zone" and a sub-brand "GoTone" of China Mobile, or different package services of the same sub-brand of the same service provider, for example, a CNY 25 package service and a CNY 125 package service that are of a sub-brand "M-zone" of China Mobile.

The profile server is also referred to as a subscription management server, and is a server for downloading a profile. The profile server may be a subscription manager data preparation (subscription manager data preparation, SM-DP) server. The SM-DP server includes an SM-DP+ server.

The profile in the embodiments of the present application is a general term of a series of files and data, and the files and data which are related to a service provider are stored and run inside the eUICC, the iUICC, or the iSIM card. The profile includes user identification information and service subscription information. The user identification information includes information such as user identity, authentication parameters, operator-customized parameters, applications, file systems, and profile metadata.

In the embodiments of the present application, a first subscriber identity module card in the terminal device is registered. To be specific, the user has been verified based on the user identification information such as identity information of the user, and a subscription relationship is provided for the user and registration is performed for the user, to activate the first subscriber identity module card, so that the user can access a connection service provided by the first service provider through service registration information. In the embodiments, a second profile may be generated based on the existing service registration information related to the first service provider, so that the terminal device subscribes to the second service provider for registration. Detailed descriptions are provided below.

Figure 2:
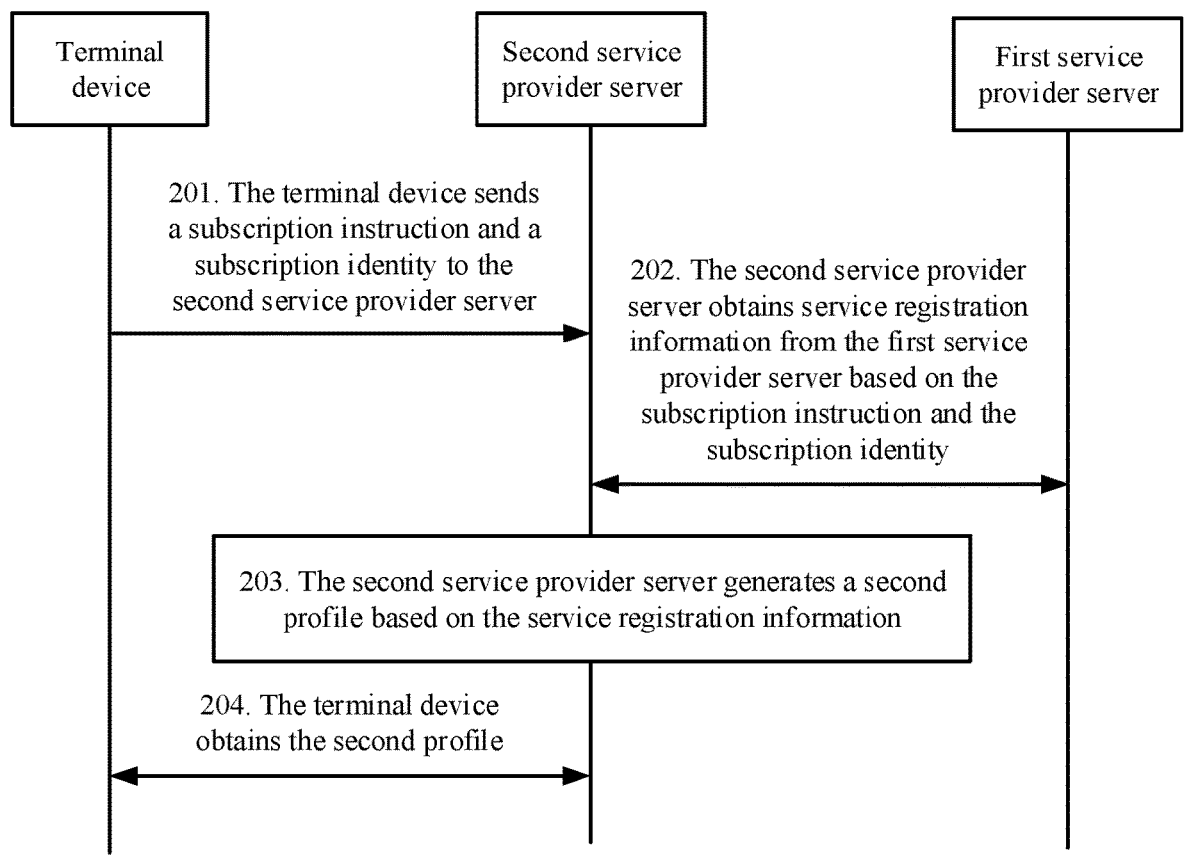
FIG. 2 is a flowchart of an information exchange between a terminal device and a service provider server according to an embodiment of the present application.

With reference to FIG. 2, a profile generation method and a profile acquisition method in the embodiments of the present application include the following steps.

201. A terminal device sends a subscription indication and a subscription identity to a second service provider server.

The terminal device comprises a first subscriber identity module card. The first subscriber identity module card has been registered, and accesses a first service provider network based on service registration information. When the terminal device needs to access a second service provider network, the terminal device needs to establish a subscription relationship with the second service provider server and perform registration. Therefore, the terminal device sends the subscription indication and the subscription identity to the second service provider server.

Wherein, the first subscriber identity module card may be a common pluggable SIM card, or may be a eUICC or an iUICC, or may be an iSIM card.

The subscription indication is used to notify a specific manner of the second service provider server, and in the specific manner the terminal device subscribes to the second service provider network. For example, the subscription indication may be an indication of "applying for new subscription for registration based on the first subscriber identity module card", or an indication of "applying for new subscription for registration based on a first profile in the first subscriber identity module card", or an indication of "upgrading the first subscriber identity module card", or the subscription indication is a common subscription indication.

A second service provider determines that the subscription indication is applying for new subscription for registration to the second service provider according to the first subscriber identity module card, according to the subscription indication and the subscription identity that represents a first user identity.

Optionally, in an embodiment, the subscription indication may be a request initiated by a user through a service provider application on the terminal device. For example, the user initiates a subscription application to the second service provider server through the service provider APP on the terminal, and then may receive subscription information returned from the second service provider server. The user may feedback information such as accepting the subscription application through the service provider APP.

Optionally, in another embodiment, the subscription indication may be a request initiated by a LPA in the terminal device. For example, when the first subscriber identity module card in the terminal device is identified as a China Mobile user, if the user roams to France, the LPA may actively initiate an access subscription application to France Telecom cooperating with China Mobile according to the first subscriber identity module card.

Optionally, in another embodiment, the terminal device may alternatively first receive a notification message from the second service provider. The notification message is used to notify the terminal device that the terminal device can perform new subscription. Then, the terminal device sends the subscription indication to the second service provider server. For example, the second service provider sends a push message to the terminal device. The message is used to notify the terminal device that a new package may be selected. If the user agrees to select the package, sending the subscription indication to the second service provider server may be triggered.

The subscription identity may include at least one of two identifiers, the two identifiers including an identifier of the first subscriber identity module card in the terminal device and an identifier of the first profile in the first subscriber identity module card. For example, if the first subscriber identity module card is a common pluggable SIM card, the subscription identity may be an identifier of the pluggable SIM card; if the first subscriber identity module card is a eUICC, the subscription identity may be an identifier of the eUICC or an identifier of a first profile in an eUICC; if the first subscriber identity module card is an iUICC, the subscription identity may be an identifier of the iUICC or an identifier of a first profile in the iUICC; if the first subscriber identity module card is an iSIM card, the subscription identity may be an identifier of the iSIM card or an identifier of a first profile in the iSIM card.

Optionally, the subscription indication and the subscription identity may be carried in one message and sent together, may also be carried in two different messages and sent separately.

202. The second service provider server acquires the service registration information from a first service provider server according to the subscription indication and the subscription identity.

After receiving the subscription indication and the subscription identity that are sent by the terminal device, the second service provider server acquires the service registration information from the first service provider server according to the subscription indication and the subscription identity.

The service registration information may include user information used by the terminal device to access the first service provider network, may also include user information and subscription information that are used by the terminal device to access the first service provider network. Wherein, the user information may be at least one of information such as user identity card information, a phone number of the user, SIP uniform resource identifier (uniform resource identifier, URI) address based on a session initiation protocol (session initiation protocol, SIP) of the user, a telephone URI address, user payment information, and user preference information. The subscription information may be service package information of the user, or the like, for example, service information or business information such as what services subscribed by the user (services included in a package), and a signed service contract.

Optionally, in an embodiment, a method, in which the second service provider server acquires the service registration information from the first service provider server according to the subscription indication and the subscription identity, may be: the second service provider server sends a registration verification request to the first service provider server according to the subscription indication, the registration verification request carries the subscription identity, the registration verification request is used by the first service provider server to verify identity information of the user; after verifying a user identity according to the subscription identity, the first service provider server sends the service registration information corresponding to the subscription identity to the second service provider server; the second service provider server receives the service registration information sent by the first service provider server. In this manner, after verifying the subscription identity of the terminal device, the first service provider server sends the service registration information acquired when the user performs subscription to the second service provider server. This is more secure.

Optionally, a process, in which the first service provider server verifies the user identity according to the subscription identity, may be: the first service provider server sends a verification request message to the terminal device; after receiving the verification request message sent by the first service provider server, the terminal device returns a verification response message to the first service provider server; and if the first service provider server determines that verification performed on the user identity succeeds according to the verification response message, the first service provider server sends the service registration information to the second service provider server.

In this verification process, the verification request message may include verification information, for example, a verification code. The verification response message also includes the verification information, and the verification information is used by the first service provider server to verify the subscription identity of the terminal device.

Optionally, a process, in which the first service provider server verifies the user identity according to the subscription identity, may alternatively be: the first service provider server sends a verification request message to the terminal device; after receiving the verification request message sent by the first service provider server, the terminal device sends a verification response message to the first service provider server by the second service provider server; and if the first service provider server determines that verification performed on the user identity succeeds according to the verification response message, the first service provider server sends the service registration information to the second service provider server.

In this verification process, the verification request message may include verification information, for example, a verification code. The verification response message also includes the verification information, and the verification information is used by the first service provider server to verify the subscription identity of the terminal device.

Optionally, in another embodiment, the first service provider server may consider that the subscription identity sent by the terminal device is reliable, and directly send the service registration information to the second service provider server without verifying the user identity. Specifically, the second service provider server sends a registration verification request to the first service provider server according to the subscription indication, wherein the registration verification request carries the subscription identity; and the first service provider server sends the service registration information to the second service provider server, wherein the service registration information is service registration information used by a user corresponding to the subscription identity to access the first service provider network.

203. The second service provider server generates a second profile based on the service registration information.

After receiving the service registration information, the second service provider server generates the second profile used to access the second service provider network, based on the service registration information.

204. The terminal device acquires the second profile.

The terminal device acquires the second profile, so that the terminal device can access the second service provider network through the second profile.

In this embodiment, if the first subscriber identity module card in the terminal device has been registered with a first service provider, when the user needs to subscribe to the second service provider for registration, the terminal device sends the subscription indication and the subscription identity to the second service provider server, then the second service provider server acquires the service registration information from the first service provider server according to the subscription indication and the subscription identity, the service registration information is used by the first subscriber identity module card to access the first service provider network, and the second service provider server generates the second profile for accessing the second service provider network based on the service registration information. Therefore, the second profile may be generated based on the existing service registration information related to the first service provider, so that the terminal device subscribes to the second service provider for registration. In this way, after the user performs subscription for registration once, the user can subscribe to another service provider for registration without a need to submit an identity for verification again, so that user operations can be simplified and user experience can be improved.

Optionally, a process, in which the terminal device acquires the second profile, may be: the terminal device acquires the second profile from the second service provider server by a profile server. For example, the second service provider server generates an instruction of downloading a profile, and sends the instruction to a profile server of the second service provider. For example, the instruction is sent to an SM-DP server, and then the SM-DP server sends the instruction to the LPA in the terminal device. The LPA triggers a profile downloading process according to the instruction, and then downloads the second profile from the second service provider server by the SM-DP server.

Further, optionally, after receiving the second profile, the terminal device installs and activates the second profile. According to different application scenarios, the terminal device sends different subscription indications to the second service provider server, and the second profile is installed at different locations. The following uses application scenarios as examples for description.

Scenario 1: The first subscriber identity module card is upgraded.

When the subscription indication sent by the terminal device to the second service provider server is a first subscriber identity module card upgrading instruction (that is, the instruction of "upgrading the first subscriber identity module card"), after the terminal device receives the second profile, the terminal device installs the second profile and activates the second profile, so that the terminal device accesses the second service provider network. At the same time, the terminal device disables the first subscriber identity module card. The "the terminal device disables the first subscriber identity module card" herein may be that the terminal device closes the first subscriber identity module card, and no longer supplies power to the first subscriber identity module card, so that the terminal device subsequently only accesses the network through the second profile.

In this scenario, in addition to the first subscriber identity module card, the terminal device further includes a second subscriber identity module card. According to the subscriber identity module card upgrading instruction, the terminal device installs the second profile in the second subscriber identity module card, and activates the second profile, at the same time disables the first subscriber identity module card.

In this manner, after the subscriber identity module card is upgraded, the terminal device no longer supplies power to the first subscriber identity module card, so as to reduce power consumption and resources of the terminal device, and may prevent the terminal device from activating the original first subscriber identity module card when the first subscriber identity module card is not disabled.

Scenario 2: Applying for new subscription based on the first subscriber identity card.

In this scenario, the first subscriber identity module card may be a common pluggable SIM card, and the terminal device has accessed the first service provider network by the pluggable SIM card. In addition to the first subscriber identity module card, the terminal device further includes a second subscriber identity module card. The second subscriber identity module card is a eUICC, an iUICC, an iSIM card, or a SIM card in another form.

Before the terminal device sends the subscription identity to the second service provider server, the terminal device acquires the subscription identity, the subscription identity is an identifier of the pluggable SIM card. After receiving the second profile, the terminal device installs the second profile in the second subscriber identity module card. For example, if the second subscriber identity module card is a eUICC, the second profile is installed in the eUICC; if the second subscriber identity module card is an iUICC, the second profile is installed in the iUICC; if the second subscriber identity module card is an iSIM card, the second profile is installed in the iSIM card.

Scenario 3: Applying for new subscription based on the first profile in the first subscriber identity module card.

In this scenario, the first subscriber identity module card may be a eUICC, an iUICC, or an iSIM card, the first profile exists in the first subscriber identity module card, and the terminal device has accessed the first service provider network by the first profile.

Before the terminal device sends the subscription identity to the second service provider server, the terminal device acquires the subscription identity. The subscription identity may be the identifier of the first subscriber identity module card, may also be the identifier of the first profile in the first subscriber identity module card, may further be the identifier of the first subscriber identity module card and the identifier of the first profile in the first subscriber identity module card.

In an implementation, after receiving the second profile, the terminal device installs the second profile in the first subscriber identity module card.

In another implementation, if the terminal device further includes a second subscriber identity module card, and the second subscriber identity module card is a eUICC, an iUICC, or an iSIM card, after receiving the second profile, the terminal device may install the second profile in the second subscriber identity module card. For example, the terminal device installs the second profile in the second subscriber identity module card according to information such as a context or an identifier of the second subscriber identity module card.

The foregoing describes an information exchange between the terminal device and The service provider server. It should be noted that in the embodiments of the present application, the terminal device may specifically exchange information with each service provider server by the LPA and the service provider application shown in FIG. 1.

In an embodiment, the LPA in the terminal device sends the subscription indication and the subscription identity to the second service provider server; it is used to indicate that the second service provider server acquires the service registration information from the first service provider server according to the subscription identity, the service registration information is used by the first subscriber identity module card to access the first service provider network, and the first service provider server generates the second profile based on the service registration information. The LPA receives the second profile, so that the terminal device can access the second service provider network by the second profile.

Figure 3:
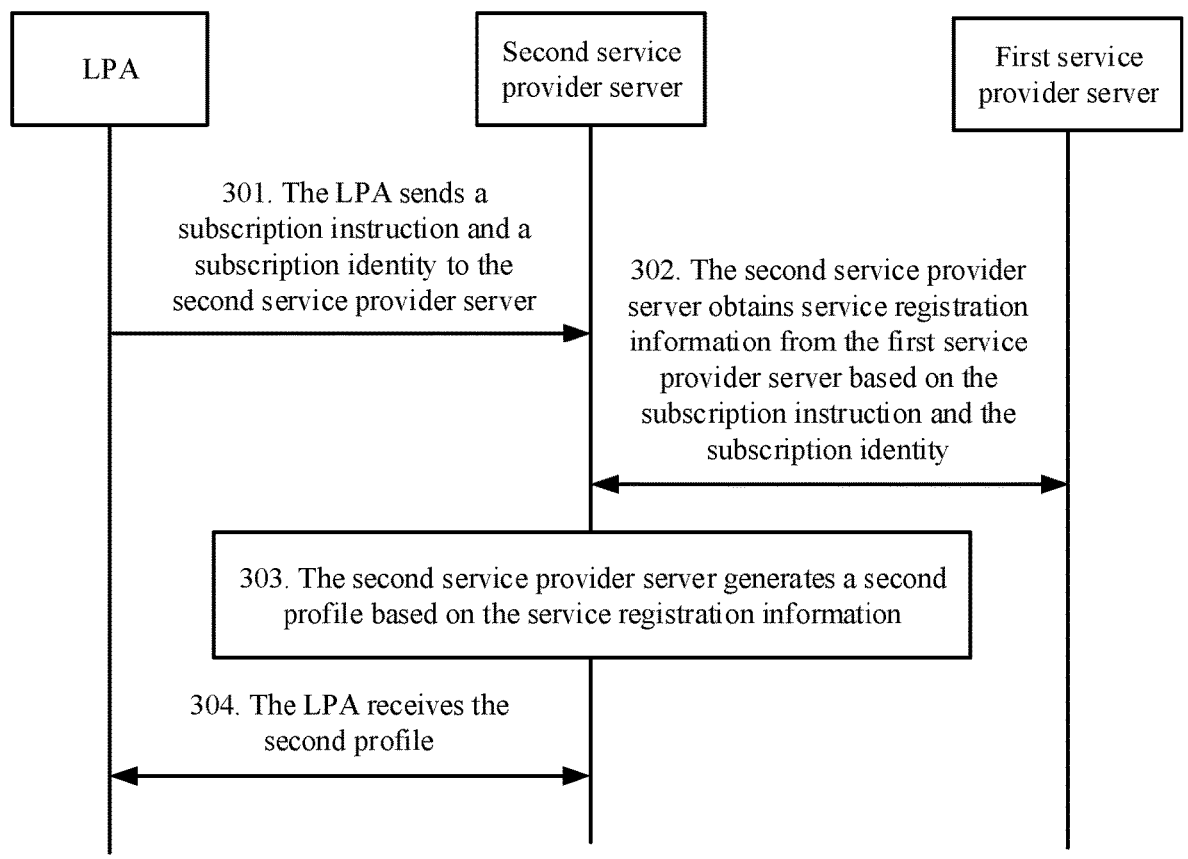
FIG. 3 is a flowchart of an information exchange between a LPA and a service provider server according to an embodiment of the present application.

The following describes in detail a method for acquiring a profile by a LPA with reference to FIG. 3.

301. The LPA sends a subscription indication and a subscription identity to a second service provider server.

A terminal device comprises a first subscriber identity module card. The first subscriber identity module card has been registered, and has accessed a first service provider network based on service registration information. When the terminal device needs to access a second service provider network, the terminal device needs to establish a subscription relationship with the second service provider server and perform registration, and the LPA in the terminal device sends the subscription indication and the subscription identity to the second service provider server.

The first subscriber identity module card comprises a pluggable SIM card, a eUICC, an iUICC, or an iSIM card.

The subscription indication and the subscription identity are the same as those described in step 201. Details are not described herein again.

Optionally, the subscription indication may be a request initiated by a service provider application, the service provider application sends the subscription indication to the LPA, and then the LPA sends the subscription indication to the second service provider server. The subscription indication may also be a request initiated by the LPA, and then the LPA sends the subscription indication to the second service provider server. The subscription indication may further be a notification message which is first received by the terminal device from the second service provider, the notification message is used to notify the terminal device that the terminal device can perform new subscription, and then the LPA just sends the subscription indication to the second service provider server.

Further, optionally, when the subscription indication is the request initiated by the service provider application, before the LPA sends the subscription indication and the subscription identity to the second service provider server, the LPA receives the subscription indication sent by a second service provider application, and acquires the subscription identity according to the subscription indication.

Further, optionally, a specific manner, in which the LPA sends the subscription indication and the subscription identity to the second service provider server, may be: the LPA sends the subscription indication and the subscription identity to the second service provider server by the second service provider application.

Optionally, the subscription indication and the subscription identity may be carried in one message and sent together, or may be carried in two different messages and sent separately.

302. The second service provider server acquires the service registration information from the first service provider server according to the subscription identity, the service registration information is used by the first subscriber identity module card to access the first service provider network.

Step 302 is the same as step 202. For details, refer to step 202 in the embodiment shown in FIG. 2.

Specifically, in a process, in which the first service provider server verifies a user identity according to the subscription identity, when the first service provider server sends a verification request message to the terminal device, the first service provider server specifically sends the verification request message to the first subscriber identity module card in the terminal device. When the terminal device sends a verification response message to the first service provider server by the second service provider server, the LPA may acquire the verification response message. The verification response message is a response of the first subscriber identity module card to the verification request message received from the first service provider server. The LPA sends the verification response message to the second service provider server by the second service provider application, so that the second service provider server sends the verification response message to the first service provider server. After verifying the user identity according to the verification response message, the first service provider server sends the service registration information to the second service provider server.

303. The second service provider server generates a second profile based on the service registration information.

After receiving the service registration information, the second service provider server generates a second profile that can be used to access the second service provider network, based on the service registration information.

304. The LPA receives the second profile.

After the second service provider server generates the second profile, the LPA in the terminal device acquires the second profile, so that the terminal device can access the second service provider network by the second profile.

Optionally, a process in which the LPA acquires the second profile may be: the LPA acquires the second profile from the second service provider server by a profile server. For example, the second service provider server generates an instruction of downloading a profile, and sends the instruction to a profile server of the second service provider, such as, the instruction is sent to an SM-DP server, and then the SM-DP server sends the instruction to the LPA. The LPA triggers a profile downloading process according to the instruction, and downloads the second profile from the second service provider server by the SM-DP server.

Further, optionally, when the subscription indication is a first subscriber identity module card upgrading instruction, after the LPA receives the second profile, the LPA installs and activates the second profile, and disables the first subscriber identity module card. The "the terminal device disables the first subscriber identity module card" herein may be that the terminal device closes the first subscriber identity module card, and no longer supplies power to the first subscriber identity module card, so that the terminal device subsequently only accesses the network through the second profile.

The following describes an information exchange between a terminal device and a service provider server in detail with reference to application scenarios.

Figure 4A:
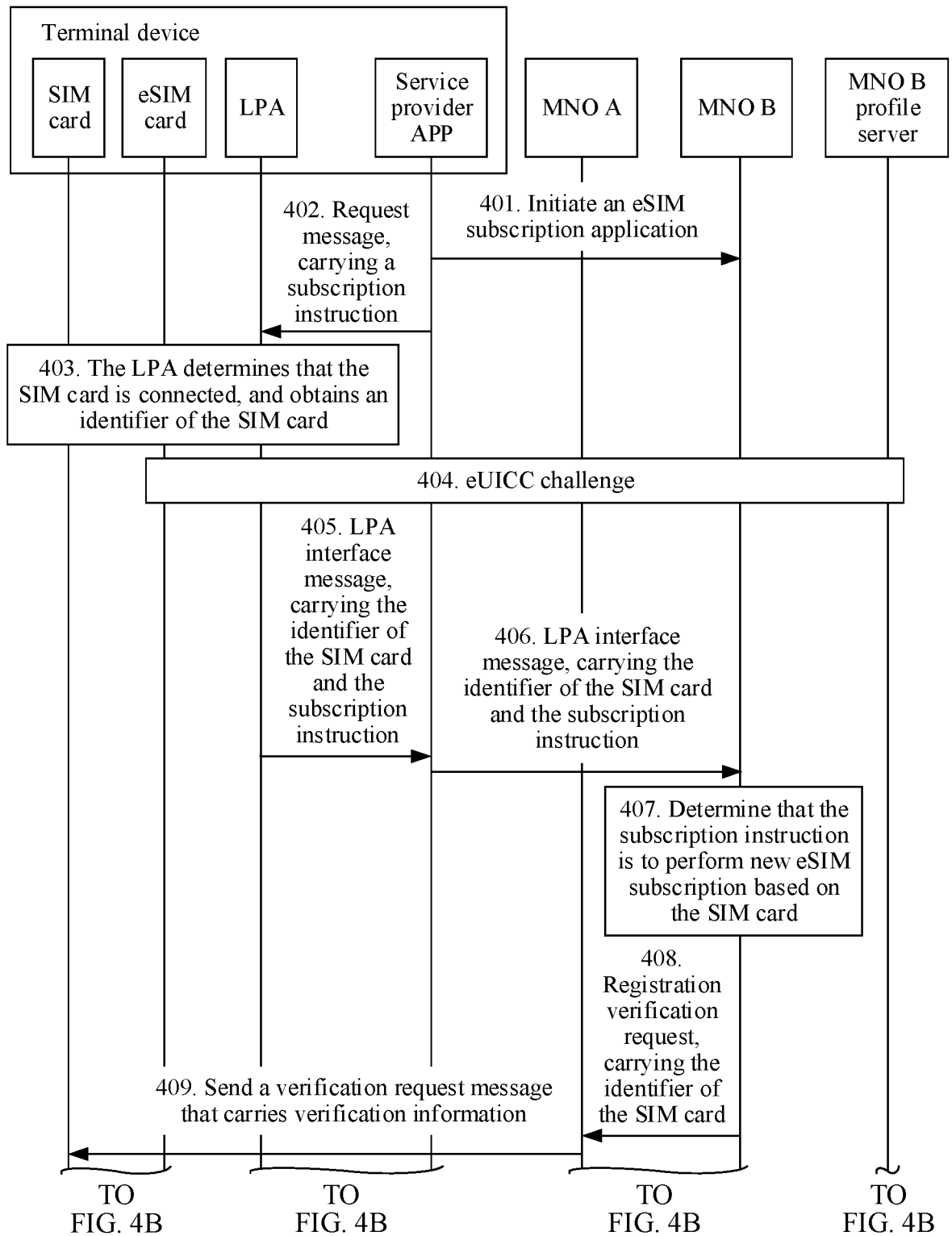
FIG. 4A and FIG. 4B are flowcharts of an information exchange among a terminal device, a service provider server, and a profile server according to an embodiment of the present application.
Figure 4B:
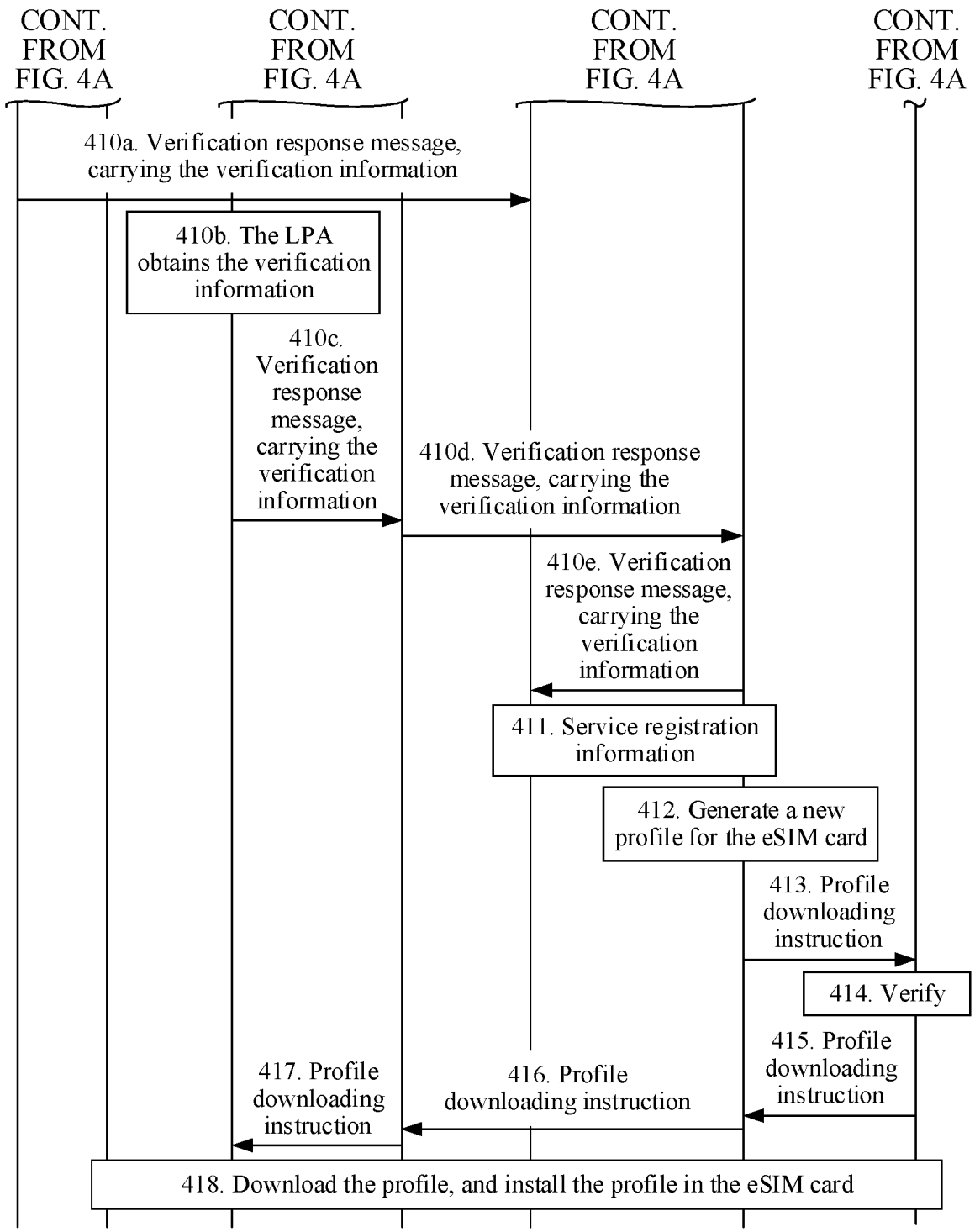

FIG. 4A and FIG. 4B show a scenario of applying for new subscription based on a first subscriber identity module card. In this embodiment, an example in which the first subscriber identity card is a common pluggable SIM card is used, and an example in which the second subscriber identity card is an eSIM card (that is, a eUICC) is used for description. In this embodiment, an example in which The service provider server is an MNO server is used for description, wherein MNO A represents the first service provider server, and MNO B represents the second service provider server.

In this scenario, when a common pluggable SIM card exists in a terminal device, a subscription relationship of the pluggable SIM card, that is, service registration information used by the pluggable SIM card when the pluggable SIM card accesses the first service provider, may be used as a verification basis, and subscribes an eSIM card in the terminal device to another different service provider for registration, and generates a new profile, that is, establishes a new subscription relationship, and the new profile is downloaded to use a connection service provided by the another different service provider network.

401. A user initiates an eSIM card subscription application to MNO B by a service provider application on the terminal device, and then may receive subscription information returned from MNO B. The user may feedback information such as accepting the subscription application by the service provider application.

Optionally, the service provider APP may also add a subscription indication to the initiated eSIM card subscription application. The subscription indication is used to notify MNO B to apply for new subscription based on the first subscriber identity card, so that MNO B subsequently acquires service registration information of a user from MNO A.

402. The service provider APP on the terminal device sends a request message to a LPA through a LPA interface, wherein the request message carries the subscription indication, so as to request the LPA to provide the user with a service of applying for new subscription for registration based on the first subscriber identity module card. For example, the service provider APP provides indication information such as an option "applying for new subscription for registration based on the first subscriber identity module card", and the service provider APP transfers the indication information to the LPA, so that the LPA requests a registration procedure according to the indication information, the registration procedure is based on an existing common pluggable SIM card.

403. The LPA determines that a pluggable SIM card exists in the terminal device and the SIM card is connected, and further acquires an identifier of the pluggable SIM card, for example, by reading an international mobile equipment identity (international mobile equipment identity, IMEI) or a mobile subscriber international isdn/pstn number (mobile subscriber international isdn/pstn number, MSISDN) of the SIM card, or acquiring information about the SIM card from a modem (modem), or reading an MSISDN of the SIM card from a system.

404. Optionally, to verify reliability of the eSIM card, the LPA sends a request message for acquiring a eUICC challenge (eUICC challenge) to the eSIM card, and the LPA receives a response message that carries the eUICC challenge returned from the eSIM card. The LPA sends the response message that carries the eUICC challenge to a profile server, and the eUICC challenge is carried in a response message returned from a profile server, so as to prove that the response message subsequently returned from the profile server is a response to a request initiated by the eSIM card. That is, the eSIM card verifies that the eUICC challenge included in the message returned from the profile server is originally sent by the eSIM card. For example, the eUICC challenge is a random number, such as 12345. If the eSIM card returns 12345, it is considered that the eSIM card is reliable. If the eSIM card does not return 12345, it is considered that the eSIM card is unreliable.

405. The LPA returns a LPA interface message to the service provider APP through the LPA interface, wherein the LPA interface message includes LPA interface information (LPA API info), and may carry the acquired identifier of the common pluggable SIM card. Optionally, the LPA interface message may further carry the subscription indication, and the subscription indication may be an indication of "applying for new subscription for registration based on the first subscriber identity module card", so that MNO B subsequently acquires the service registration information of the user from MNO A.

406. The service provider APP further sends the LPA interface message to MNO B.

407. MNO B determines specific indication content according to the subscription indication carried in the LPA interface message in step 406 or the subscription indication carried in step 401, and determines that the subscription indication is to perform new eSIM subscription according to the pluggable SIM card, that is, to generate a new profile for the eSIM card, or to generate a new subscription relationship.

408. MNO B sends a registration verification request to MNO A according to the identifier of the pluggable SIM card provided by the service provider APP, wherein the registration verification request carries the identifier of the pluggable SIM card.

MNO A further performs user verification on the identifier of the pluggable SIM card according to the registration verification request. A verification manner may be adopt step 409 to step 410a, or may be adopt step 409 to steps 410b-410e.

409. MNO A sends a verification request message to the terminal device of the pluggable SIM card, wherein the verification request message comprises verification information, for example, verification information sent by a mobile phone short message service (short message service, SMS), verification information sent by an over the air (over the air, OTA) interface, or verification information sent by an internet protocol (internet protocol, IP). The verification information may be a random verification code.

410a. Optionally, after receiving the verification request message, the terminal device of the pluggable SIM card may directly return a verification response message to MNO A, wherein the verification response message carries the received verification information.

410b. Optionally, after receiving the verification request message, the terminal device of the pluggable SIM card sends the verification information in the verification request message to the LPA.

410c. After acquiring the verification information, the LPA sends a verification response message to the service provider APP through the LPA interface, wherein the verification response message carries the verification information.

410d. the service provider APP sends the verification response message that carries the verification information to MNO B.

410e. MNO B further sends the verification response message to MNO A for verification.

411. If MNO A determines that verification performed on a user identity succeeds according to the verification response message, MNO A sends service registration information corresponding to the identifier of the pluggable SIM card to MNO B, so that MNO B generates a new subscription relationship for the user according to the service registration information.

The service registration information may include user information used by the terminal device to access a first service provider network, may also include user information and subscription information that are used by the terminal device to access a first service provider network. Wherein, the user information may be at least one of information such as user identity card information, a phone number of the user, SIP uniform resource identifier (uniform resource identifier, URI) address based on a session initiation protocol (session initiation protocol, SIP) of the user, a telephone URI address, user payment information, and user preference information. The subscription information may be service package information of the user, or the like, for example, service information or business information such as what services subscribed by the user (services included in a package), and a signed service contract.

412. MNO B generates a new profile (a second profile) for the user based on the service registration information, wherein the new profile is to be downloaded by the LPA.

413. MNO B sends a profile downloading instruction (command code) to the profile server, and the profile server downloads the second profile from MNO B. Wherein, the profile server may be a subscription manager-data preparation SM-DP server.

414-417. The profile server verifies the profile downloading instruction, and then sends the profile downloading instruction to the service provider APP by MNO B, and then the service provider APP sends the profile downloading instruction to the LPA.

418. The LPA triggers a profile downloading process according to the profile downloading instruction, and then downloads the second profile from the profile server, and installs the second profile in the eSIM card.

In this embodiment, the common pluggable SIM card is inserted into the terminal device. The user initiates the eSIM card subscription application by the service provider APP on the terminal device. The service provider APP on the terminal device acquires the identifier of the common pluggable SIM card of the user. A second service provider sends verification information to the pluggable SIM card according to the identifier of the SIM card. The terminal device acquires the verification information, and sends the verification information to the first service provider server (MNO A). MNO A determines an identity of the pluggable SIM card according to the verification information, acquires the service registration information of the common pluggable SIM card, and sends the service registration information to the second service provider server (MNO B). MNO B generates the new profile (the second profile) for the user according to the service registration information, and generates the profile downloading instruction, so that the terminal device can download the second profile from a network side of a service provider and install the profile in the eSIM card.

In this implementation solution, the verification information is received by the common pluggable SIM card, so that after verifying the SIM card, the first service provider server sends the service registration information of the common pluggable SIM card to the second service provider server. The second service provider server can generate the second profile used for new subscription for the eSIM card based on the service registration information of the common pluggable SIM card. According to this implementation solution, after verifying the pluggable SIM card, the first service provider server sends the service registration information when the user performs subscription to the second service provider server. This is more secure. At the same time, a complex operation that the user repeatedly provides the service registration information for registration is simplified, so that user experience is improved.

Figure 5A:
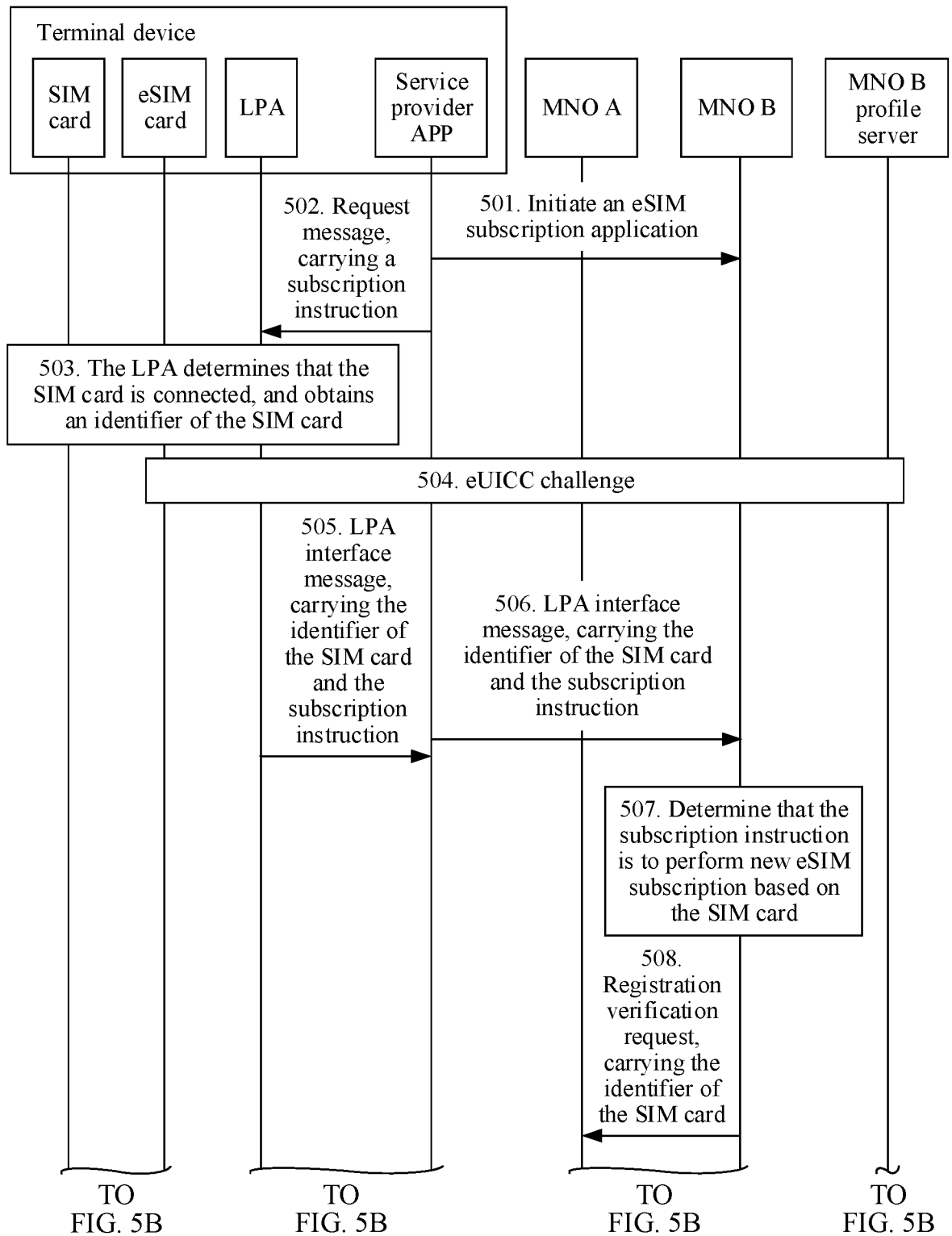
FIG. 5A and FIG. 5B are another flowcharts of an information exchange among a terminal device, a service provider server, and a profile server according to an embodiment of the present application.
Figure 5B:
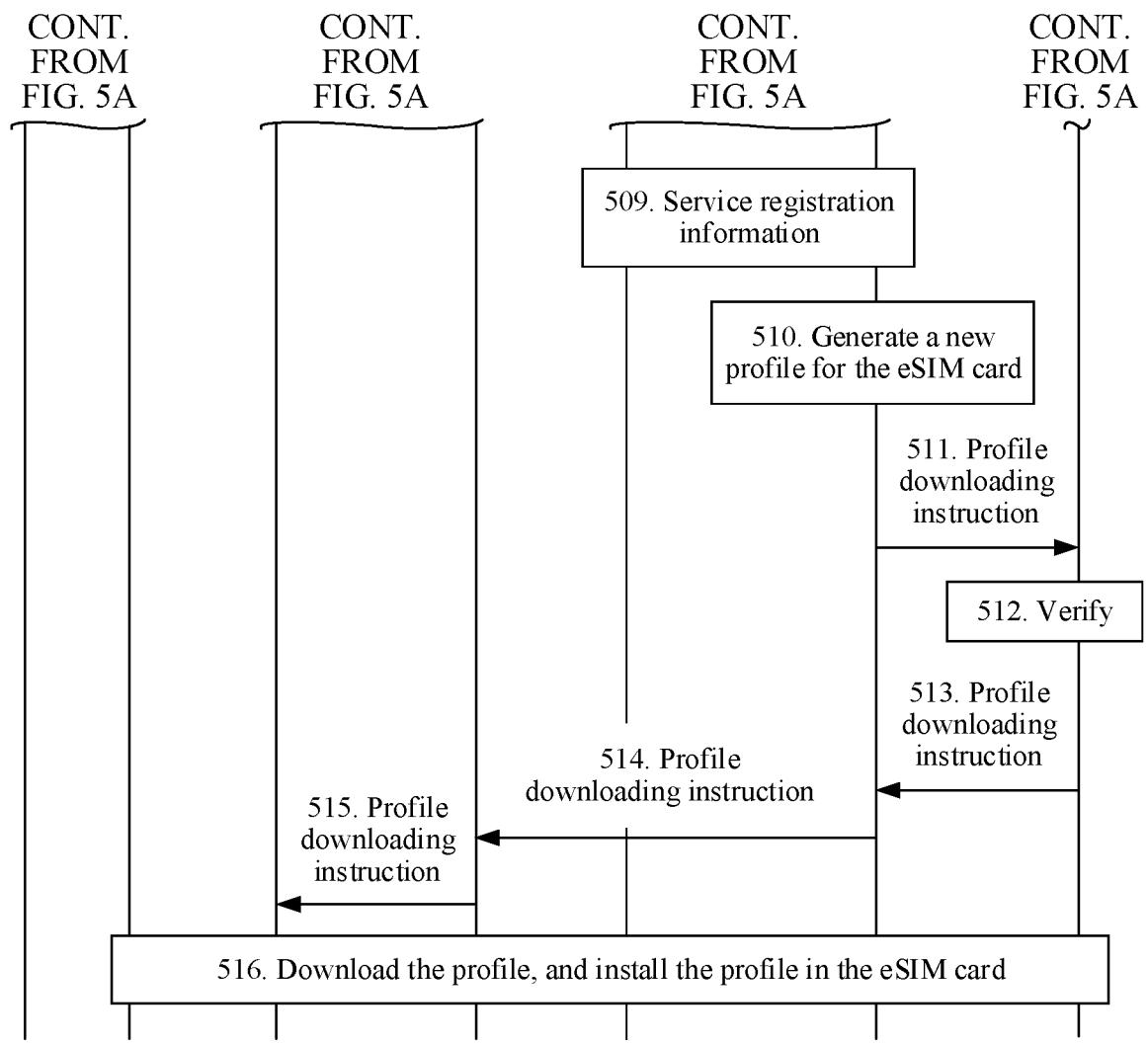

FIG. 5A and FIG. 5B show another scenario of applying for new subscription based on a first subscriber identity module card. In this embodiment, an example in which the first subscriber identity card is a common pluggable SIM card is used, and an example in which the second subscriber identity card is an eSIM card (that is, a eUICC) is used for description. In this embodiment, an example in which The service provider server is an MNO server is used for description, wherein MNO A represents the first service provider server, and MNO B represents the second service provider server.

In the scenario shown in FIG. 5A and FIG. 5B, because a LPA is used as a system-level application on a terminal device, the terminal device considers that an identifier of a SIM card is reliable, wherein the identifier is acquired by the LPA. Therefore, the first service provider server directly sends service registration information to the second service provider server.

Step 501 to step 507 are the same as step 401 to step 407 in the embodiment shown in FIG. 4A and FIG. 4B. Details are not described herein again. For the details, refer to the embodiment shown in FIG. 4A and FIG. 4B.

508. MNO B sends a registration verification request to MNO A according to the identifier of the pluggable SIM card provided by the service provider APP, wherein the registration verification request carries the identifier of the pluggable SIM card.

509. MNO A verifies the registration verification request, and returns the service registration information corresponding to the identifier of the pluggable SIM card to MNO B.

510. After receiving the service registration information of the user that is sent by MNO A, MNO B generates a new subscription relationship for the eSIM card of the user based on the service registration information. That is, MNO B generates a new profile (a second profile) for the user based on the service registration information, wherein the new profile is to be downloaded by the LPA.

511-516. The LPA acquires the second profile from MNO B by the profile server. A specific procedure is the same as step 413 to step 418 in the embodiment shown in FIG. 4A and FIG. 4B. Details are not described herein again.

In this embodiment, because the LPA is used as a system-level application on the terminal, it is considered that the identifier of the SIM card acquired by the LPA is reliable. The second service provider server (MNO B) directly sends the identifier of the SIM card to the first service provider server (MNO A) for verification, and MNO A sends the service registration information when the user performs subscription to MNO B. In this way, a complex operation that the user repeatedly provides user information for registration is simplified. At the same time, compared with the solution in the embodiment shown in FIG. 4A and FIG. 4B, in this embodiment, a process in which verification information is sent to the terminal device and verification information returned from the terminal device is acquired to determine a user identity is omitted. This is faster and more convenient. The interaction with the terminal device is reduced, the disturbance to the user is reduced, and the user experience is improved.

Figure 6A:
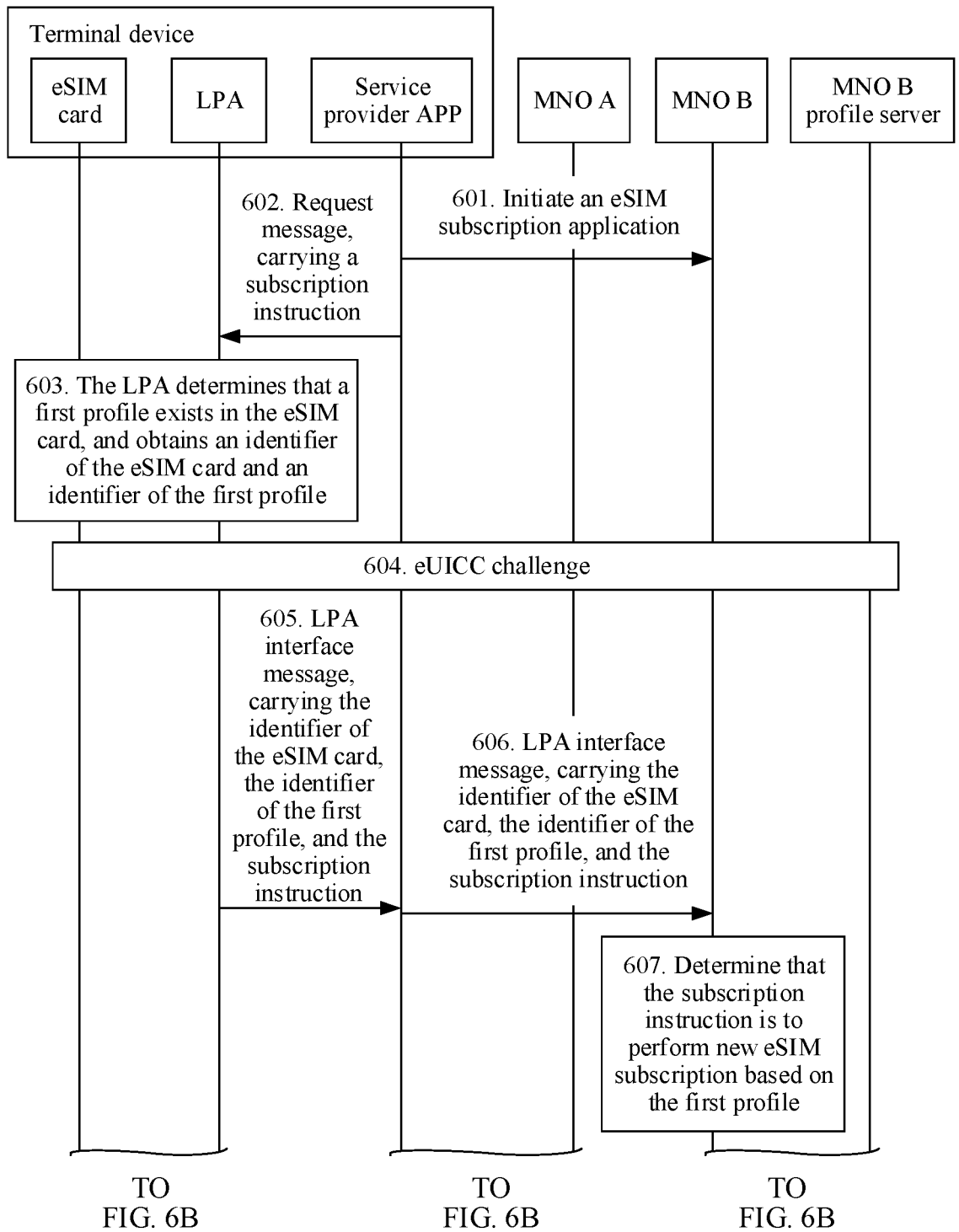
FIG. 6A and FIG. 6B are another flowcharts of an information exchange among a terminal device, a service provider server, and a profile server according to an embodiment of the present application.
Figure 6B:
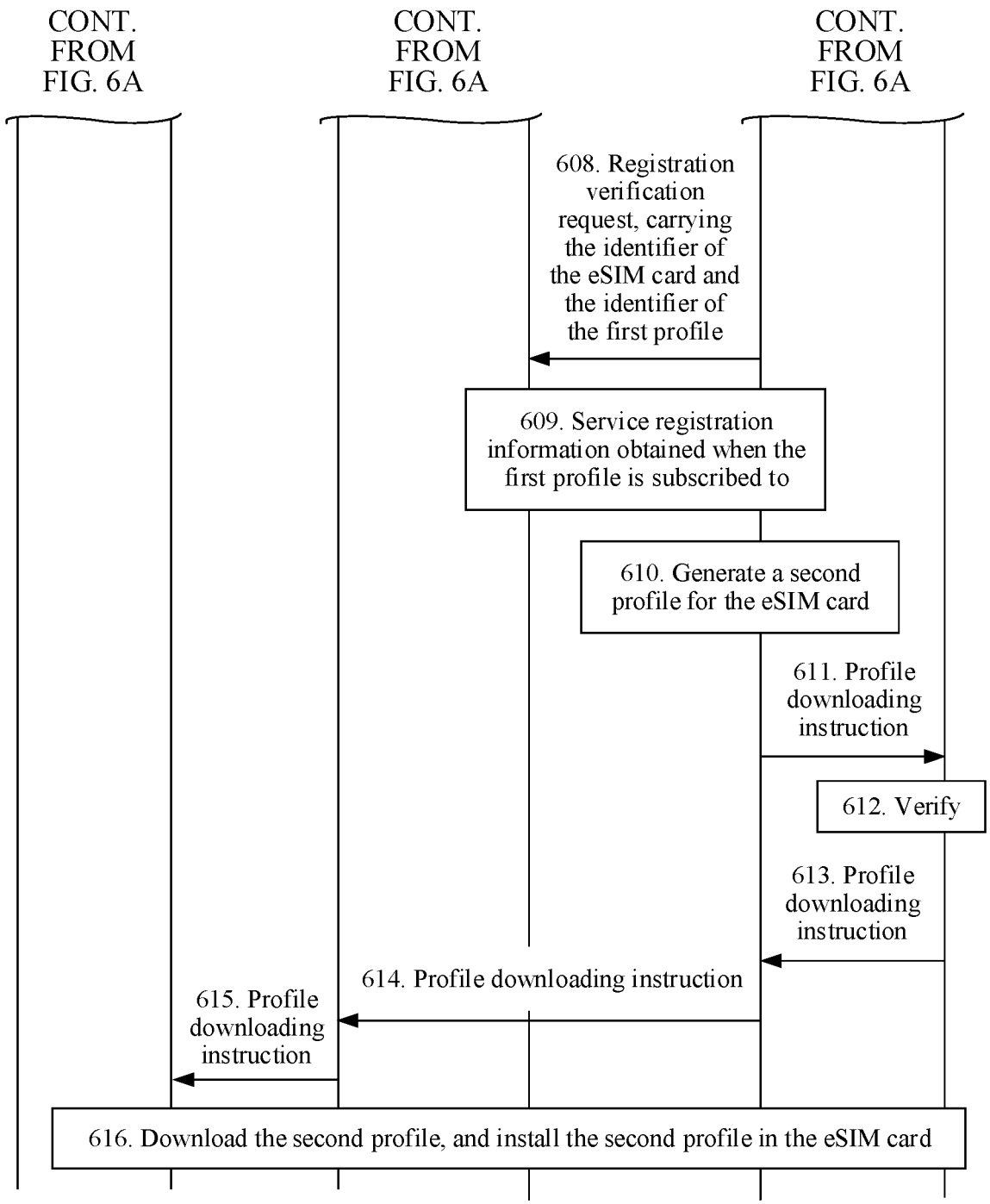

FIG. 6A and FIG. 6B show a scenario of applying for new subscription based on a profile which has been installed in a first subscriber identity module card. In this embodiment, an example in which the first subscriber identity card is an eSIM card (eUICC) is used, and an example in which the second subscriber identity card is an eSIM card (that is, a eUICC) is used for description. In this embodiment, an example in which The service provider server is an MNO server is used for description, wherein, MNO A represents the first service provider server, and MNO B represents the second service provider server.

In the embodiment shown in FIG. 6A and FIG. 6B, a method for generating a new subscription profile for the same eSIM card or another eSIM card by a subscription relationship of a profile installed in an eSIM card is provided. In this implementation, the second service provider server may generate anew profile based on service registration information in a profile, the profile has established a subscription relationship with a first service provider network, to establish a new subscription relationship. Detailed descriptions are provided below.

601. A user initiates an eSIM card subscription application to MNO B by a service provider APP on a terminal device, and then may receive subscription information returned from MNO B. The user may feedback information such as accepting the subscription application by the service provider APP.

Optionally, the service provider APP may further add a subscription indication to the initiated eSIM card subscription application. The subscription indication is information used to indicate MNO B to generate a second profile for a subscription relationship based on a profile in a first eSIM card, so that MNO B subsequently acquires service registration information of a user from MNO A.

602. The service provider APP on the terminal device sends a request message to a LPA through a LPA interface, wherein the request message carries the subscription indication, so as to request the LPA to provide the user with a service of applying for new subscription for registration based on a first profile in the eSIM card. Wherein, one eSIM card or two eSIM cards may exist in the terminal device. That is, a second profile for a new subscription relationship may be generated for a second eSIM card based on a first profile in the first eSIM card, or a second profile for a new subscription relationship may be generated for the first eSIM card based on a first profile in the first eSIM card.

603. The LPA determines that an eSIM card exists in the terminal device and the first profile exists in the eSIM card, and further acquires at least one of two identifiers, the two identifiers including an identifier of the eSIM card and an identifier of the first profile, for example, by reading an IMEI or an MSISDN in the eSIM card, or reading and acquiring an IMEI or an MSISDN in the eSIM card from a modem or a system, reading a eUICC identifier (eUICC identification, EID) from the eSIM card, reading an integrated circuit card identifier (integrated circuit card ID, ICCID) from profile metadata.

604. Optionally, to verify reliability of the eSIM card, the LPA sends a request message for acquiring a eUICC challenge (eUICC challenge) to the eSIM card, and the LPA receives a response message returned from the eSIM card, the response message carries the eUICC challenge. The response message that carries the eUICC challenge is sent to a profile server and the eUICC challenge is carried in a response message returned from a profile server, so as to prove that the response message subsequently returned from the server is a response to a request initiated by the eSIM card. That is, the eSIM card verifies that the eUICC challenge included in the message returned from the profile server is originally sent by the eSIM card. For example, the eUICC challenge is a random number, such as 12345. If the eSIM card returns 12345, it is considered that the eSIM card is reliable. If the eSIM card does not return 12345, it is considered that the eSIM card is unreliable.

605. The LPA returns a LPA interface message to the service provider APP through the LPA interface, wherein the LPA interface message includes LPA interface information (LPA API info), and may carry the at least one of two identifiers, the two identifiers including the acquired identifier of the eSIM card and the identifier of the first profile. Optionally, the LPA interface message may further carry the subscription indication, and the subscription indication may be an indication of "applying for new subscription for registration based on the first profile in the eSIM card", so that MNO B subsequently acquires the service registration information of the user from MNO A.

606. The service provider APP further sends the LPA interface message to the second service provider server MNO B.

607. MNO B determines specific indication content according to the subscription indication carried in the LPA interface message in step 606 or the subscription indication carried in step 601, and determines that the subscription indication is the indication of "applying for new subscription for registration based on the first profile in the eSIM card".

608. MNO B sends a registration verification request to the first service provider server MNO A according to the at least one of two identifiers, the two identifiers including the identifier of the eSIM card and the identifier of the first profile in the eSIM card that are provided by the service provider APP, wherein the registration verification request carries the at least one of the identifier of the eSIM card and the identifier of the first profile in the eSIM card.

Optionally, MNO A may further perform user verification on the identifier of the eSIM card according to the registration verification request, and after verification succeeds, MNO A provides MNO B with service registration information of the user, the service registration information of the user corresponds to the identifier of the eSIM card or the identifier of the first profile in the eSIM card, so that MNO B generates a new subscription relationship for the user according to the service registration information. For a process in which MNO A performs user verification on the identifier of the eSIM card or the identifier of the first profile in the eSIM card, refer to a process in which MNO A further performs user verification on the identifier of the pluggable SIM card according to the registration verification request in the embodiment shown in FIG. 4A and FIG. 4B, to be specific, may refer to step 409 and step 410a, or may refer to step 409 and steps 410b-410e.

This embodiment is described by an example in which MNO A directly sends the service registration information to MNO B.

609. Optionally, MNO A directly returns to MNO B the service registration information when the user performs subscription the first profile according to the registration verification request.

The service registration information may include user information used by the terminal device to access the first service provider network, may also include user information and subscription information that are used by the terminal device to access the first service provider network. Wherein, the user information may be at least one of information such as user identity card information, a phone number of the user, SIP uniform resource identifier (uniform resource identifier, URI) address based on a session initiation protocol (session initiation protocol, SIP) of the user, a telephone URI address, user payment information, and user preference information. The subscription information may be service package information of the user, or the like, for example, service information or business information such as what services subscribed by the user (services included in a package), and a signed service contract.

610. MNO B generates a new subscription relationship for an eSIM card of the user based on the service registration information when the user performs subscription on the first profile, that is, generates the second profile, wherein the second profile is to be downloaded by the LPA.

611-615. The LPA acquires the second profile from MNO B by the profile server. A specific procedure is the same as step 413-step 417 in the embodiment shown in FIG. 4A and FIG. 4B. Details are not described herein again.

616. The LPA installs the second profile in the eSIM card. If one eSIM card exists in the terminal device, and the subscription indication is to generate a second profile of a new subscription relationship for the eSIM card based on the first profile, the second profile is installed in the eSIM card. If two eSIM cards exist in the terminal device, and the subscription indication is to generate a second profile of a new subscription relationship for the second eSIM card based on the first profile in the first eSIM card, the second profile is installed in the second eSIM card.

In this embodiment, when a profile of a subscription relationship exists in the eSIM card in the terminal device, a new subscription relationship may be established with another different service provider for the eSIM card or another eSIM card in the terminal based on the profile, and the second profile is generated. The second profile is downloaded to use a connection service provided by another service provider network.

According to this embodiment, a new subscription relationship can be generated for the second profile by a subscription relationship of the first profile in the eSIM card. This is more secure. A complex operation that the user repeatedly provides the user information for registration is simplified, so that user experience is improved.

Figure 7A:
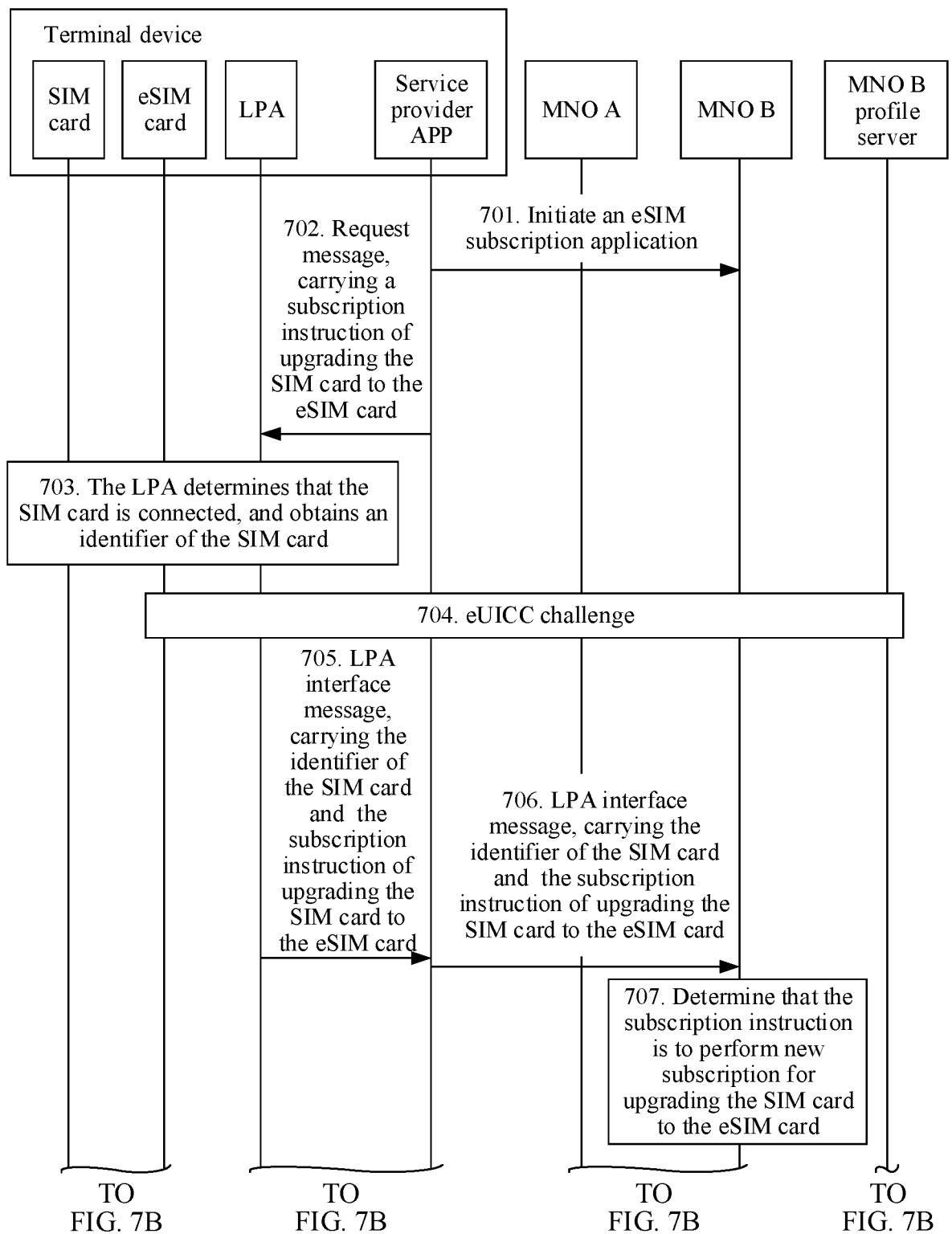
FIG. 7A and FIG. 7B are another flowcharts of an information exchange among a terminal device, a service provider server, and a profile server according to an embodiment of the present application.
Figure 7B:
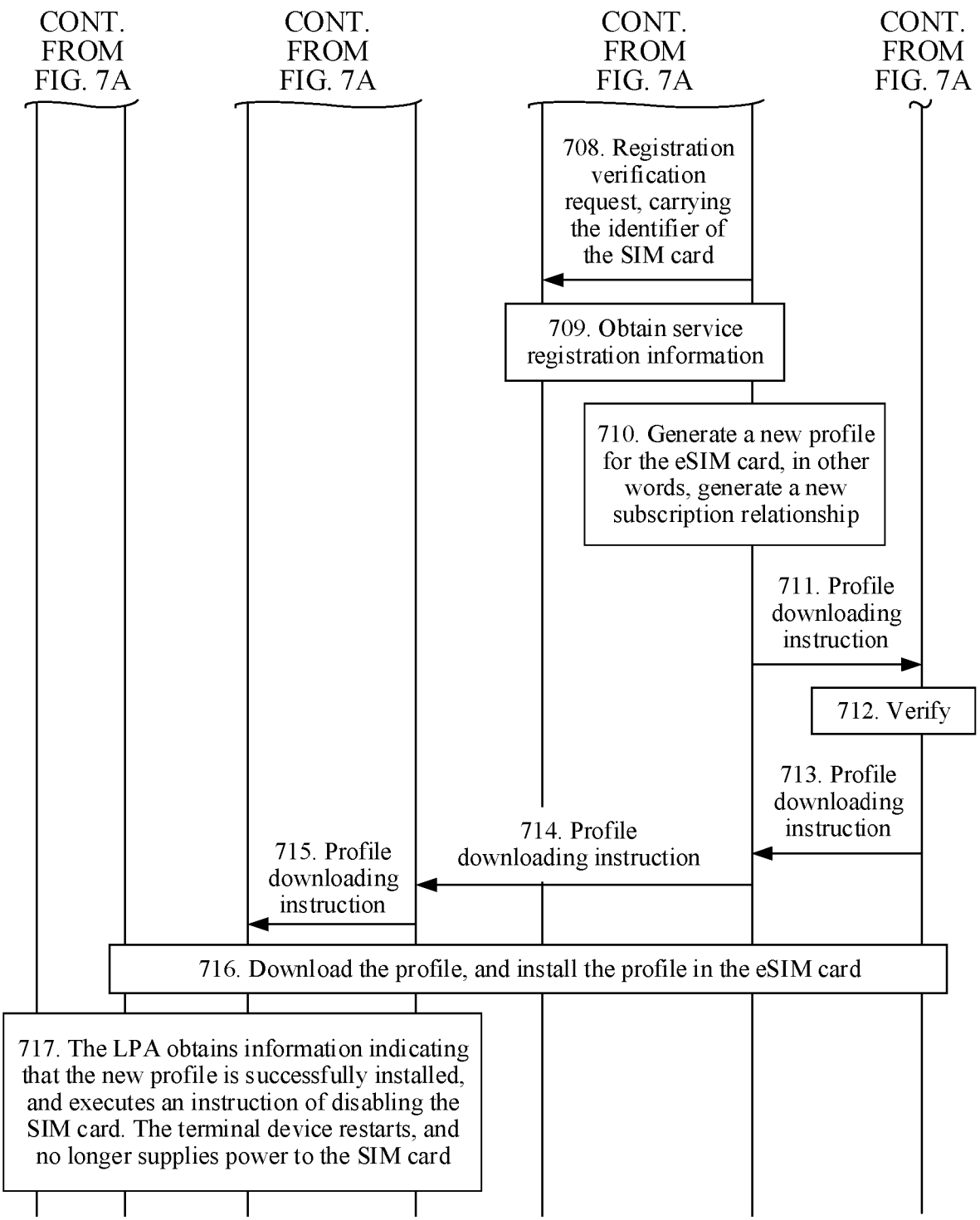

An embodiment shown in FIG. 7A and FIG. 7B is a scenario in which an existing first subscriber identity module card is upgraded. In this embodiment, an example in which the first subscriber identity card is a common pluggable SIM card is used, and an example in which the second subscriber identity card is an eSIM card (that is, a eUICC) is used for description. In this embodiment, an example in which The service provider server is an MNO server is used for description, wherein MNO A represents the first service provider server, and MNO B represents the second service provider server.

The implementation solution of the present application proposes a method for upgrading a subscription relationship to a profile in an eSIM card by an existing subscription relationship in a common pluggable SIM card. According to the method in this embodiment, the second service provider server may update the subscription relationship to the profile of the eSIM card by the service subscription information of the common pluggable SIM card, the common pluggable SIM card has established a subscription relationship with the first service provider network. Detailed descriptions are provided below.

701. A user initiates an eSIM subscription application to MNO B by a service provider APP on a terminal device, and then may receive subscription information returned from MNO B. The user may feedback information such as accepting the subscription application by the service provider APP.

Optionally, the service provider APP may also add a subscription indication to the initiated eSIM subscription application. The subscription indication is used to notify MNO B of an indication of "upgrading the subscription relationship of the SIM card to the profile of the eSIM card", for example, performing mobile number portability and upgrading the subscription relationship of the common pluggable SIM card to the profile of the eSIM card.

702. The service provider APP on the terminal device sends a request message to a LPA through a LPA interface, wherein the request message carries the subscription indication of upgrading the first subscriber identity module card, so as to request the LPA to provide the user with a service of applying for a new subscription relationship based on the existing pluggable SIM card.

703. The LPA determines that a pluggable SIM card exists in the terminal device and the SIM card is connected, and further acquires an identifier of the pluggable SIM card, for example, by reading an IMEI or an MSISDN of the SIM card, or acquiring information about the SIM card from a modem (modem), or reading an MSISDN of the SIM card from a system.

704. Optionally, to verify reliability of the eSIM card, the LPA sends a request message for acquiring a eUICC challenge (eUICC challenge) to the eSIM card, and the LPA receives a response message returned from the eSIM card, the response message carries the eUICC challenge. The response message that carries the eUICC challenge is sent to a profile server and the eUICC challenge is carried in a response message returned from a profile server, so as to prove that the response message subsequently returned from the server is a response to a request initiated by the eSIM card. That is, the eSIM card verifies that the eUICC challenge included in the message returned from the profile server is originally sent by the eSIM card. For example, the eUICC challenge is a random number, such as 12345. If the eSIM card returns 12345, it is considered that the eSIM card is reliable. If the eSIM card does not return 12345, it is considered that the eSIM card is unreliable.

705. The LPA returns a LPA interface message to the service provider APP through the LPA interface, wherein the LPA interface message includes LPA interface information (LPA API info), and may carry the acquired identifier of the common pluggable SIM card. Optionally, the LPA interface message may further carry the subscription indication, and the subscription indication may be an indication of "upgrading the subscription relationship of the SIM to the profile of the eSIM card", so that MNO B subsequently acquires the service registration information of the user from MNO A.

706. The service provider APP further sends the LPA interface message to MNO B.

707. MNO B determines specific indication content according to the subscription indication carried in the LPA interface message in step 706 or the subscription indication carried in step 701, and determines that the subscription indication is the indication of "upgrading the subscription relationship of the SIM card to the profile of the eSIM card".

708. MNO B sends a registration verification request to MNO A according to the identifier of the pluggable SIM card provided by the service provider APP, wherein the registration verification request carries the identifier of the SIM card.

Optionally, MNO A may further perform user verification on the identifier of the pluggable SIM card according to information in the registration verification request. After verification succeeds, MNO A provides MNO B with the service registration information of the user, the service registration information of the user corresponds to the identifier of the pluggable SIM card, so that MNO B generates a new subscription relationship for the user according to the service registration information. For a process in which MNO A performs user verification on the identifier of the pluggable SIM card, please refer to a process in which MNO A further performs user verification on the identifier of the pluggable SIM card according to the registration verification request in the embodiment shown in FIG. 4A and FIG. 4B, to be specific, may refer to step 409 to step 410a, may also refer to step 409 and steps 410b to 410e.

This embodiment is described by an example in which MNO A directly sends the service registration information to MNO B.

709. MNO A verifies the registration verification request, and returns the service registration information corresponding to the identifier of the pluggable SIM card.

The service registration information may include user information, and may further include subscription information. The user information may be at least one of information such as user identity card information, a phone number of the user, SIP-based SIP URI address of the user, a telephone URI address, user payment information, and user preference information. The subscription information may be service package information of the user, or the like, for example, service information or business information such as what services subscribed by the user (services included in a package), and a signed service contract. The phone number of the user, the SIP-based SIP URI address of the user, and the TEL URI address are used to implement mobile number portability of the user.

In this scenario in which the SIM card is upgraded, the service registration information may further include SIM data such as a file system, an international mobile subscriber identity (international mobile subscriber identity, IMSI), a key, and an encryption algorithm in the common pluggable SIM card, so that a profile generated for the eSIM card in step 710 carries related information about the pluggable SIM card.

710. After performing verification, MNO B generates the profile (a second profile) for the eSIM card of the user based on the received service registration information, that is, generates a new subscription relationship.

711-716. The LPA acquires the second profile from the second service provider server by the profile server, and installs the second profile in the eSIM card. A specific procedure is the same as step 413-step 418 in the embodiment shown in FIG. 4A and FIG. 4B. Details are not described herein again.

717. The terminal device acquires information of the profile installation success, and executes an instruction of disabling the common pluggable SIM card. The LPA notifies the user that the common pluggable SIM card is no longer to be used and the terminal device is to be restarted. After the LPA receives a confirmation message entered by the user, the LPA indicates to disable the common pluggable SIM card, restart the terminal, read the newly installed second profile from the eSIM card, and connect to a network by using the newly installed second profile. The LPA notifies MNO B that upgrading for the user succeeds.

According to this embodiment, the subscription relationship in the common pluggable SIM card can be upgraded to a subscription relationship of a profile of an eSIM card in the second service provider network. This is more secure, also simplifies a complex operation that the user repeatedly provides user information for registration, and brings better user experience. According to this implementation solution, the user can implement, based on the subscription relationship in the existing SIM card, mobile number portability to become an eSIM card user, so that user experience can be improved.

At the same time, in this embodiment, after the common SIM card is upgraded to the profile of the eSIM card, the terminal device no longer supplies power to the common pluggable SIM card, so as to reduce power consumption and resources of the terminal device. This avoids a case in which the terminal device cannot perceive whether a new subscription profile is generated or a profile of an original SIM card is upgraded to a profile of an eSIM card, and consequently, the terminal device activates the original profile when the common pluggable SIM card is not disabled.

The foregoing embodiments of the present application can resolve a problem that the user repeatedly submits verification information required for registration, for example, identity verification information and SMS verification information. Based on the existing service registration information, after performing subscription for registration once, the user may perform subscription for registration across service providers, to achieve a subscription service across service providers, so that user operations are simplified, and user experience is improved.

The foregoing describes the method embodiments in the embodiments of the present application. The following describes the terminal device and the server in the embodiments of the present application from a perspective of a function module and from a perspective of hardware implementation.

Figure 8:
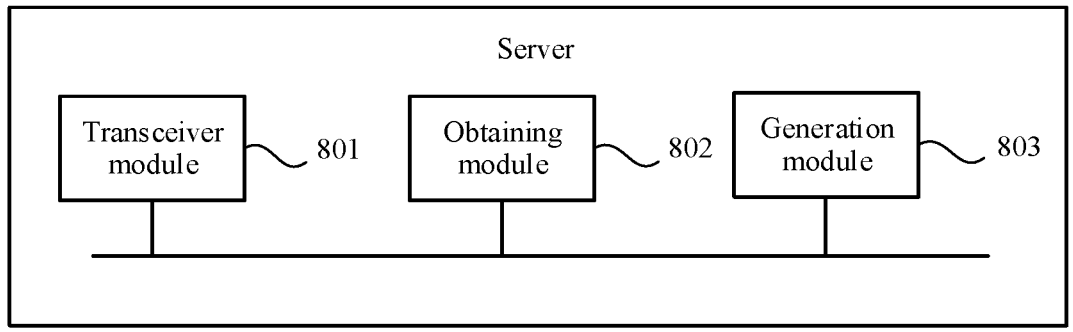
FIG. 8 is a schematic structural diagram of a function module of a server according to an embodiment of the present application.

A server shown in FIG. 8 is The service provider server or the MNO server described in the foregoing method embodiments. As shown in FIG. 8, the server includes at least the following function modules:

a transceiver module 801, configured to receive a subscription indication and a subscription identity that are sent by a terminal device, wherein the subscription identity includes at least one of two identifiers, the two identifiers including an identifier of a first subscriber identity module card in the terminal device and an identifier of a first profile in the first subscriber identity module card, and the first subscriber identity module card accesses a first service provider network based on service registration information;

an acquisition module 802, configured to acquire the service registration information from the first service provider server according to the subscription indication and the subscription identity; and a generation module 803, configured to generate a second profile based on the service registration information, wherein the second profile is used by the terminal device to access a second service provider network.

In some specific embodiments, the acquisition module 802 is specifically configured to: send a registration verification request to the first service provider server according to the subscription indication, wherein the registration verification request carries the subscription identity; and then receive the service registration information sent by the first service provider server, wherein the service registration information is information sent by the first service provider server after the first service provider server verifies a user identity according to the subscription identity.

In some specific embodiments, the acquisition module 802 is specifically configured to: send a registration verification request to the first service provider server according to the subscription indication, wherein the registration verification request carries the subscription identity; and then receive the service registration information sent by the first service provider server, wherein the service registration information is service registration information used by a user corresponding to the subscription identity to access the first service provider network.

In some specific embodiments, the first subscriber identity module card includes a pluggable subscriber identity module SIM card, an embedded universal integrated circuit card eUICC, an integrated universal integrated circuit card iUICC or an iSIM card.

Figure 9:
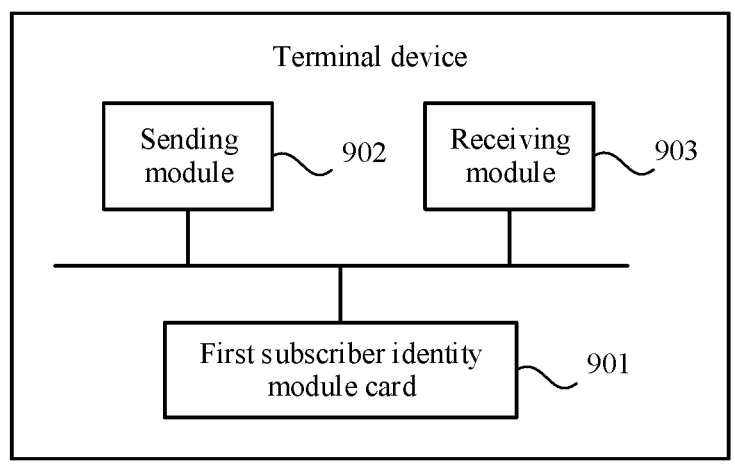
FIG. 9 is a schematic structural diagram of a function module of a terminal device according to an embodiment of the present application.

FIG. 9 is a schematic diagram of a function module of a terminal device. The terminal device includes a first subscriber identity module card 901. The first subscriber identity module card accesses a first service provider network based on service registration information. In addition, the terminal device includes at least the following function modules:

a sending module 902, configured to send a subscription indication and a subscription identity to a second service provider server, wherein the subscription indication is used to indicate the second service provider server to acquire the service registration information from a first service provider server based on the subscription identity, and to generate a second profile based on the service registration information, wherein the second profile is used by the terminal device to access a second service provider network; and a receiving module 903, configured to receive the second profile.

In some specific embodiments, the receiving module 903 is further configured to receive a verification request message sent by the first service provider server; and the sending module 902 is further configured to send a verification response message to the first service provider server, wherein the verification response message is used by the first service provider server to send the service registration information to the second service provider server.

In some specific embodiments, the receiving module 903 is further configured to receive a verification request message sent by the first service provider server; and the sending module 902 is further configured to send a verification response message to the first service provider server by the second service provider server, wherein the verification response message is used by the first service provider server to send the service registration information to the second service provider server.

In some specific embodiments, when the subscription indication is a first subscriber identity module card upgrading indication, the terminal device further comprises: an installation module, configured to install and activate the second profile after the receiving module 903 receives the second profile; and a disabling module, configured to disable the first subscriber identity module card.

In some specific embodiments, the terminal device further includes a second subscriber identity module card, the second subscriber identity module card is an embedded universal integrated circuit card eUICC or an integrated universal integrated circuit card iUICC, the first subscriber identity module card is a pluggable subscriber identity module SIM card, and the terminal device further includes: an acquisition module, configured to acquire the subscription identity before the sending module 902 sends the subscription identity to the second service provider server, wherein the subscription identity is an identifier of the pluggable SIM card; and an installation module, further configured to install the second profile in the second subscriber identity module card after the receiving module 903 receives the second profile.

In some specific embodiments, the first subscriber identity module card is a eUICC or an iUICC, and the terminal device further includes: an acquisition module, configured to acquire the subscription identity before the sending module 902 sends the subscription identity to the second service provider server, wherein the subscription identity includes at least one of two identifiers, the two identifiers including an identifier of the first subscriber identity module card and an identifier of a first profile in the first subscriber identity module card; and an installation module, further configured to install the second profile in the first subscriber identity module card after the receiving module 903 receives the second profile.

In some specific embodiments, the first subscriber identity module card is a eUICC or an iUICC, the terminal device further comprises a second subscriber identity module card, the second subscriber identity module card is a eUICC or an iUICC, and the terminal device further includes: an acquisition module, further configured to acquire the subscription identity before the sending module 902 sends the subscription identity to the second service provider server, wherein the subscription identity includes at least one of two identifiers, the two identifiers include an identifier of the first subscriber identity module card and an identifier of a first profile in the first subscriber identity module card; and an installation module, configured to install the second profile in the second subscriber identity module card after the receiving module receives the second profile.

Figure 10:
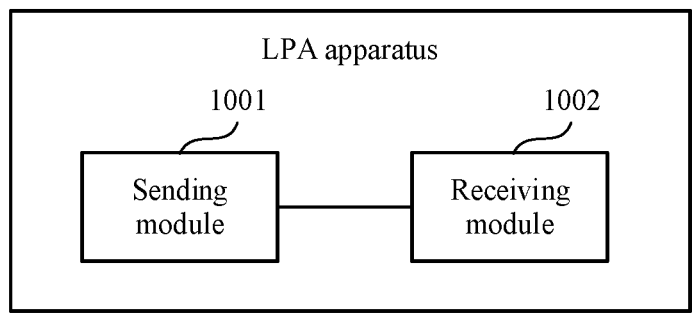
FIG. 10 is a schematic structural diagram of a function module of a LPA apparatus according to an embodiment of the present application.

FIG. 10 is a schematic diagram of a function module of a LPA apparatus. The LPA apparatus includes the following function modules:

a sending module 1001, configured to send a subscription indication and a subscription identity to a second service provider server, wherein the subscription indication is used to indicate the second service provider server to acquire service registration information from a first service provider server according to the subscription identity, the service registration information is used by a first subscriber identity module card to access a first service provider network, and generate a second profile based on the service registration information, wherein the second profile is used by a terminal device to access a second service provider network; and a receiving module 1002, configured to receive the second profile.

In some specific embodiments, the receiving module 1002 is further configured to: before the sending module sends the subscription indication and the subscription identity to the second service provider server, receive the subscription indication sent by a second service provider application; and the LPA apparatus further includes: an acquisition module, configured to acquire the subscription identity according to the subscription indication.

In some specific embodiments, the sending module 1001 is specifically configured to send the subscription indication and the subscription identity to the second service provider server by the second service provider application.

In some specific embodiments, the acquisition module is further configured to acquire a verification response message after the sending module 1001 sends the subscription indication and the subscription identity to the second service provider server, wherein the verification response message is a response of the first subscriber identity module card to a verification request message received from the first service provider server; and the sending module 1001 is further configured to send the verification response message to the second service provider server by the second service provider application, wherein the verification response message is used by the first service provider server to send the service registration information to the second service provider server after the first service provider server receives the verification response message from the second service provider server and verifies the verification response message.

In some specific embodiments, when the subscription indication is a first subscriber identity module card upgrading indication, the LPA apparatus further includes: an installation module, configured to install and activate the second profile after the receiving module 1002 receives the second profile; and a disabling module, configured to disable the first subscriber identity module card.

In some specific embodiments, the first subscriber identity module card may include a pluggable subscriber identity module SIM card, an embedded universal integrated circuit card eUICC, an integrated universal integrated circuit card iUICC or an iSIM card.

The second subscriber identity module card may include a pluggable subscriber identity module SIM card, an embedded universal integrated circuit card eUICC, an integrated universal integrated circuit card iUICC or an iSIM card.

For an information exchange between modules in the apparatuses in FIG. 8 to FIG. 10, refer to the foregoing method embodiments (the embodiments shown in FIG. 1 to FIG. 7B). Details are not described in the present application.

In actual application, functions implemented by the server shown in FIG. 8, functions implemented by the terminal device shown in FIG. 9, or functions implemented by the LPA apparatus shown in FIG. 10 may be separately implemented by an application-specific integrated circuit (application-specific integrated circuit, ASIC) or a programmable logic device (programmable logic device, PLD). The PLD may be a complex programmable logic device (complex programmable logic device, CPLD), a field-programmable gate array (field-programmable gate array, FPGA), generic array logic (generic array logic, GAL), or any combination thereof.

In actual application, the server in the embodiments of the present application may be a server or a server cluster. The following describes in detail a hardware structure of the server with reference to FIG. 11.

Figure 11:
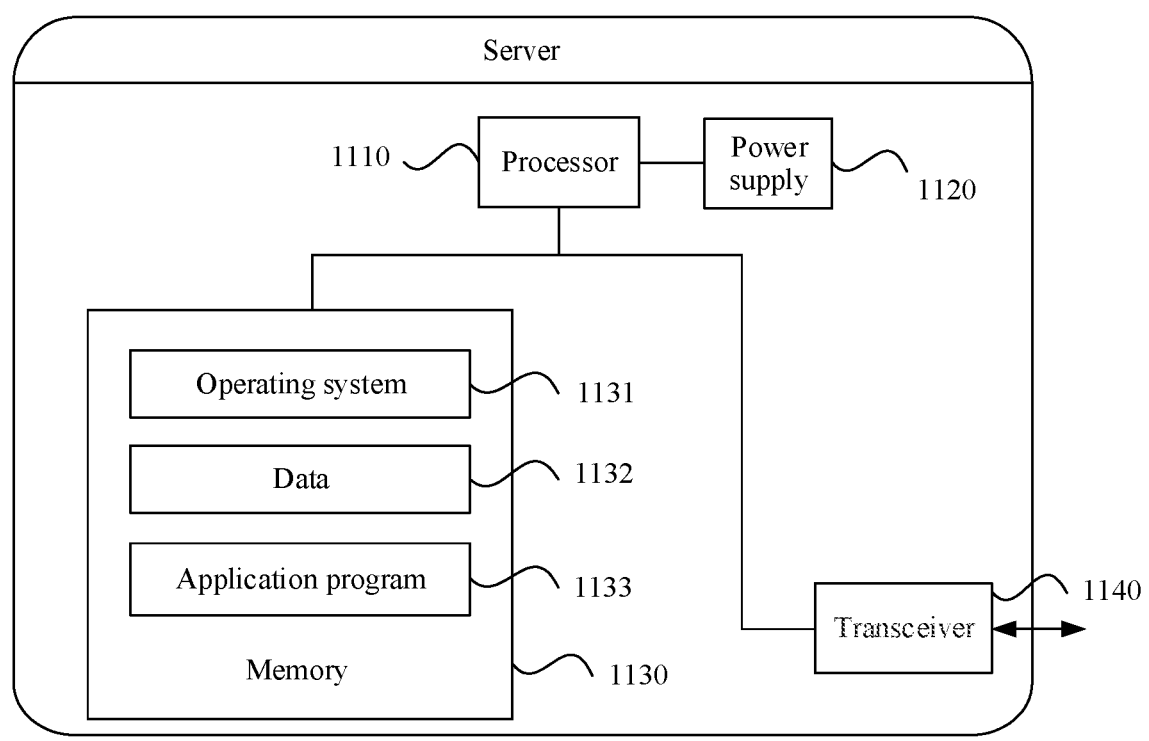
FIG. 11 is a schematic diagram of a hardware structure of a server according to an embodiment of the present application.

FIG. 11 is a schematic diagram of a hardware structure of a server according to an embodiment of the present application. The server may vary with different configurations or performance, and may include one or more processors 1110 and a memory 1130. The memory 1130 stores one or more application programs 1133, data 1132, and one or more operating systems 1131. The program stored in the memory 1130 may include one or more modules, and each module may include a series of instruction operations.

The server may further include one or more power supplies 1120, one or more transceivers 1140. The transceiver 1140 may include an input/output interface or a wired or wireless network interface.

Specifically, the processor 1110 runs instructions stored in the memory 1130, and is configured to implement all or some steps performed by the second service provider server in the foregoing method embodiments (the embodiments shown in FIG. 1 to FIG. 7A and FIG. 7B). Details may include the following:

The transceiver 1140 is configured to receive a subscription indication and a subscription identity that are sent by a terminal device, wherein the subscription identity includes at least one of two identifiers, the two identifiers including an identifier of a first subscriber identity module card in the terminal device and an identifier of a first profile in the first subscriber identity module card.

The processor 1110 is configured to acquire service registration information from a first service provider server according to the subscription indication and the subscription identity. Specifically, the processor 1110 is configured to control the transceiver 1140 to receive the service registration information sent by the first service provider server according to the subscription indication and the subscription identity.

The processor 1110 is configured to generate a second profile based on the service registration information. The terminal device can access a second service provider network by the second profile.

Optionally, the processor 1110 is configured to control the transceiver 1140 to send a registration verification request to the first service provider server according to the subscription indication. The registration verification request carries the subscription identity, which is used by the first service provider server to verify identity information of a user.

The transceiver 1140 is configured to receive the service registration information sent by the first service provider server. The service registration information is information sent by the first service provider server after the first service provider server verifies a user identity according to the subscription identity.

Optionally, the first service provider server may consider that the subscription identity sent by the terminal device is reliable. Therefore, the first service provider server directly sends the service registration information to the second service provider server without verifying the user identity. Specifically, the processor 1110 is configured to control the transceiver 1140 to send a registration verification request to the first service provider server according to the subscription indication. The registration verification request carries the subscription identity. The first service provider server sends the service registration information to the second service provider server, and the service registration information is service registration information used by a user corresponding to the subscription identity to access a first service provider network.

Figure 12:
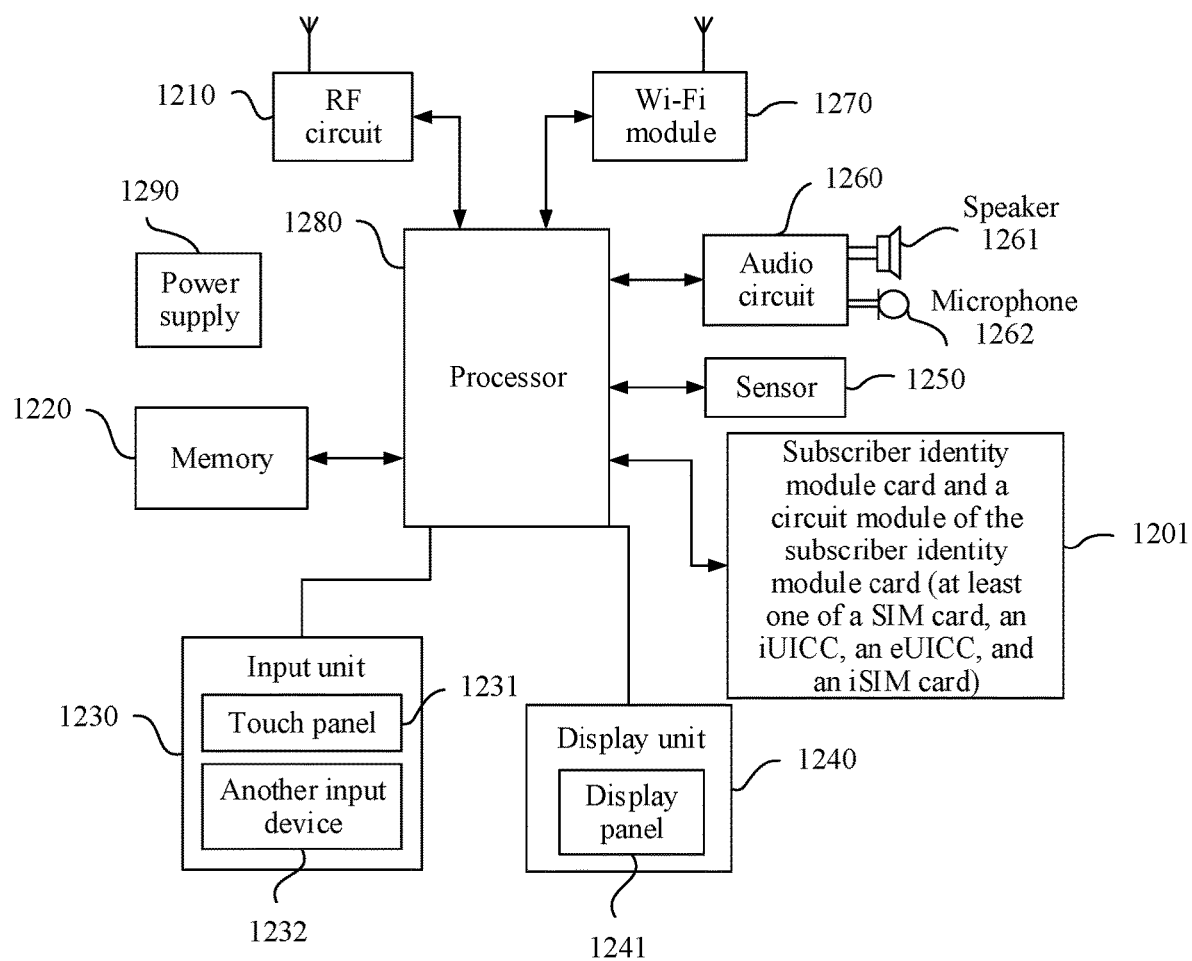
FIG. 12 is a schematic diagram of a hardware structure of a terminal device according to an embodiment of the present application.

In actual application, the terminal device may be user equipment, an internet of vehicles device, a wearable device, an internet of things device, a smart robot device, or the like that exists in various forms. The following describes in detail a hardware structure of the terminal device with reference to FIG. 12. FIG. 12 is a block diagram of a partial hardware structure of a terminal device. The terminal device includes components such as a subscriber identity module card and a circuit module of the subscriber identity module card 1201, a radio frequency (Radio Frequency, RF) circuit 1210, a memory 1220, an input unit 1230, a display unit 1240, a sensor 1250, an audio circuit 1260, a wireless fidelity (wireless fidelity, Wi-Fi) module 1270, a processor 1280, a power supply 1290, and a USB interface 1211. It can be understood by persons skilled in the art that the structure of the terminal device shown in FIG. 12 does not constitute any limitation on the terminal device, and the terminal device may include more or fewer components than those shown in the figure, or combine some components, or have different component arrangements.

The following specifically describes constituent components of the terminal device with reference to FIG. 12.

The subscriber identity module card and the circuit module thereof 1201 may be a subscriber identity module card and another circuit structure that cooperates with the subscriber identity module card to complete the profile generation method or the profile acquisition method in the embodiments of the present application. The subscriber identity module card may include at least one of a common pluggable SIM card, an iUICC, a eUICC, or an iSIM card. For example, subscriber identity module cards may include both the common pluggable SIM card and the iUICC. The subscriber identity module card may cooperate with other modules (for example, modules such as the processor 1280, the memory 1220, and the Wi-Fi module 1270) in the terminal device, to complete functions in the methods in FIG. 1 to FIG. 7B in the embodiments.

The RF circuit 1210 may be configured to receive and send a signal in an information receiving and sending process or a call process. In particular, after receiving downlink information from a base station, the RF circuit 1210 sends the downlink information to the central processing unit 1280 for processing. In addition, the RF circuit 1210 sends related uplink data to the base station. Usually, the RF circuit 1210 includes but is not limited to an antenna, at least one amplifier, a transceiver, a coupler, a low noise amplifier (Low Noise Amplifier, LNA), a duplexer, and the like. In addition, the RF circuit 1210 may further communicate with a network and another device through wireless communication. In this embodiment of the present invention, the RF circuit 1210 may also be referred to as a transceiver 1210.

The memory 1220 may be configured to store a software program and a module. By running the software program and the module stored in the memory 1220, the central processing unit 1280 executes various function applications and data processing of the terminal device. The memory 1220 may mainly include a program storage area and a data storage area. The program storage area may store an operating system, an application program required by at least one function (such as a sound playing function and an image playing function), and the like. The data storage area may store data (such as audio data and a phone book) created based on use of the terminal device, and the like. In addition, the memory 1220 may include a volatile memory, for example, a nonvolatile random access memory (nonvolatile random access memory, NVRAM), a phase-change random access memory (phase-change RAM, PRAM), or a magneto resistive random access memory (magneto resistive RAM, MRAM). The memory 1220 may alternatively include a nonvolatile memory, for example, at least one magnetic disk storage device, an electrically erasable programmable read-only memory (electrically erasable programmable read-only memory, EEPROM), a flash memory device such as a NOR flash memory (NOR flash memory) or a NAND flash memory (NAND flash memory), or a semiconductor device such as a solid state drive (solid state disk, SSD). The memory 1220 may alternatively include a combination of the foregoing types of memories.

The input unit 1230 may be configured to: receive entered digit or character information, and generate a key signal input related to a user setting and function control of the terminal device. Specifically, the input unit 1230 may include a touch panel 1231 and other input device 1232. The touch panel 1231, also referred to as a touchscreen, may collect a touch operation performed by the user on or near the touch panel 1231 (for example, an operation performed by a user on or near the touch panel 1231 by using any proper object or accessory such as a finger or a stylus), and drive a corresponding connection apparatus according to a preset program. Optionally, the touch panel 1231 may include two parts: a touch detection apparatus and a touch controller. Wherein, the touch detection apparatus detects a touch direction of the user, detects a signal brought by the touch operation, and transmits the signal to the touch controller. The touch controller receives touch information from the touch detection apparatus, converts the touch information into touch coordinates, then sends the touch coordinates to the central processing unit 1280, and can receive and execute a command sent by the central processing unit 1280. In addition, the touch panel 1231 may be implemented in a plurality of types, such as a resistive type, a capacitive type, an infrared type, and a surface acoustic wave type. In addition to the touch panel 1231, the input unit 1230 may further include other input device 1232. Specifically, the other input device 1232 may include but is not limited to one or more of a physical keyboard, a function key (for example, a volume control key or an on/off key), a trackball, a mouse, a joystick, and the like.

The display unit 1240 may be used to display information entered by the user or information provided for the user. The display unit 1240 may include a display panel 1241. Optionally, the display panel 1241 may be configured in a form of a liquid crystal display (liquid crystal display, LCD), an organic light-emitting diode (organic light-emitting diode, OLED), or the like. Further, the touch panel 1231 may cover the display panel 1241. When detecting the touch operation on or near the touch panel 1231, the touch panel 1231 transmits the touch operation to the central processing unit 1280 to determine a type of a touch event, and then the central processing unit 1280 provides a corresponding visual output on the display panel 1241 according to the type of the touch event. In FIG. 12, the touch panel 1231 and the display panel 1241 are used as two independent components to implement input and output functions of the terminal device, but in some embodiments, the touch panel 1231 and the display panel 1241 may be integrated to implement the input and output functions of the terminal device.

The terminal device may further include at least one sensor 1250, such as a light sensor, a motion sensor, and another sensor. Specifically, the light sensor may include an ambient light sensor and a proximity sensor. Wherein, the ambient light sensor may adjust luminance of the display panel 1241 according to brightness of ambient light, and when the terminal device approaches an ear, the proximity sensor may turn off the display panel 1241 and/or backlight. As a type of motion sensor, an acceleration sensor can detect a value of an acceleration in each direction (usually three axes), and can detect a value and a direction of gravity when the acceleration sensor is static, and is applicable to an application for recognizing a posture of the terminal device (for example, switching between landscape mode and portrait mode, a related game, and magnetometer posture calibration), a function related to vibration recognition (such as a pedometer or a knock), and the like. Other sensors such as a gyroscope, a barometer, a hygrometer, a thermometer, and an infrared sensor may also be configured for the terminal device. Details are not described herein.

The audio circuit 1260, a speaker 1261, and a microphone 1262 may provide an audio interface between the user and the terminal device. The audio circuit 1260 may convert received audio data into an electrical signal and transmit the electrical signal to the speaker 1261. The speaker 1261 converts the electrical signal into a sound signal for output. On the other hand, the microphone 1262 converts a collected sound signal into an electrical signal. The audio circuit 1260 receives the electrical signal, converts the electrical signal into audio data, and then outputs the audio data to the central processing unit 1280. The central processing unit 1280 processes the audio data and then via the RF circuit 1210 sends the processed audio data to such as another terminal device, or outputs the audio data to the memory 1220 for further processing.

Wi-Fi is a short-distance wireless transmission technology, and provides wireless broadband internet access for the terminal device. Although FIG. 12 shows the Wi-Fi module 1270, it may be understood that the Wi-Fi module 1270 is not a necessary part of the terminal device, and may be omitted according to a requirement without changing the essence of the present application.

The processor 1280 is a control center of the terminal device, connects parts of the entire terminal device by various interfaces and lines, and performs various functions of the terminal device and processes data by running or executing the software program and/or the module stored in the memory 1220 and invoking the data stored in the memory 1220, to perform various functions of the terminal device and process data, so as to perform overall monitoring on the terminal device. The processor 1280 may be a central processing unit (central processing unit, CPU), a general-purpose processor, a digital signal processor (digital signal processor, DSP), an application specific integrated circuit (application specific integrated circuit, ASIC), a field programmable gate array (field programmable gate array, FPGA) or other programmable logic device, a transistor logic device, a hardware component, or any combination thereof. The processor 1280 may implement or execute various example logical blocks, modules, and circuits described with reference to content disclosed in the present application. Alternatively, the processor 1280 may be a combination of processors implementing a computing function, for example, a combination of one or more microprocessors, or a combination of a DSP and a microprocessor. Optionally, the processor 1280 may include one or more processing units. Optionally, an application processor and a modem processor may be integrated into the central processing unit 1280, wherein the application processor mainly processes an operating system, a user interface, an application program, and the like. The modem processor mainly processes wireless communication. It may be understood that, the modem processor may alternatively not be integrated into the processor 1280.

In addition, the terminal device further includes the power supply 1290 (for example, a battery) that supplies power to each component. Preferably, the power supply may be logically connected to the processor 1280 by a power management system, so as to implement functions such as charging management, discharging management, and power consumption management by the power management system.

Although not shown, the terminal device may further include a camera, a Bluetooth module, and the like. Details are not described herein.

In this embodiment of the present application, details may include the following:

The processor 1280 is configured to control the transceiver 1210 to send a subscription indication and a subscription identity to a second service provider server, wherein the subscription indication is used to indicate the second service provider server to acquire service registration information from a first service provider server according to the subscription identity, and generate a second profile based on the service registration information.

The processor 1280 is further configured to control the transceiver 1210 to receive the second profile, so that the terminal device may access the second service provider network by the second profile.

Optionally, after the processor 1280 controls the transceiver 1210 to send the subscription indication and the subscription identity to the second service provider server, the processor 1280 is further configured to control the transceiver 1210 to receive a verification request message sent by the first service provider server. The verification request message is a request message sent by the first service provider to the terminal device after the first service provider receives a registration verification request sent by the second service provider, and the verification request message is used by the first service provider server to verify the subscription identity of the terminal device.

The processor 1280 is further configured to control the transceiver 1210 to send a verification response message to the first service provider server. The verification response message is used by the first service provider server to send the service registration information to the second service provider server after verification performed by the first service provider server on a user identity succeeds according to the verification response message.

Optionally, after the processor 1280 controls the transceiver 1210 to send the subscription indication and the subscription identity to the second service provider server, the processor 1280 is further configured to control the transceiver 1210 to receive a verification request message sent by the first service provider server. The verification request message is a request message sent by the first service provider to the terminal device after the first service provider receives a registration verification request sent by the second service provider, and the verification request message is used by the first service provider server to verify the subscription identity of the terminal device.

The processor 1280 is further configured to control the transceiver 1210 to send a verification response message to the first service provider server by the second service provider server. The verification response message is used by the first service provider server to send the service registration information to the second service provider server after verification performed by the first service provider server on a user identity succeeds according to the verification response message.

Optionally, when the subscription indication is a first subscriber identity module card upgrading instruction, the processor 1280 is further configured to: install and activate the second profile, and disable the first subscriber identity module card. In this implementation solution, after the subscriber identity module card is upgraded, the terminal device no longer supplies power to the first subscriber identity module card, so as to reduce power consumption and resources of the terminal device, and may prevent the terminal device from activating the original first subscriber identity module card when the first subscriber identity module card is not disabled.

Figure 13:
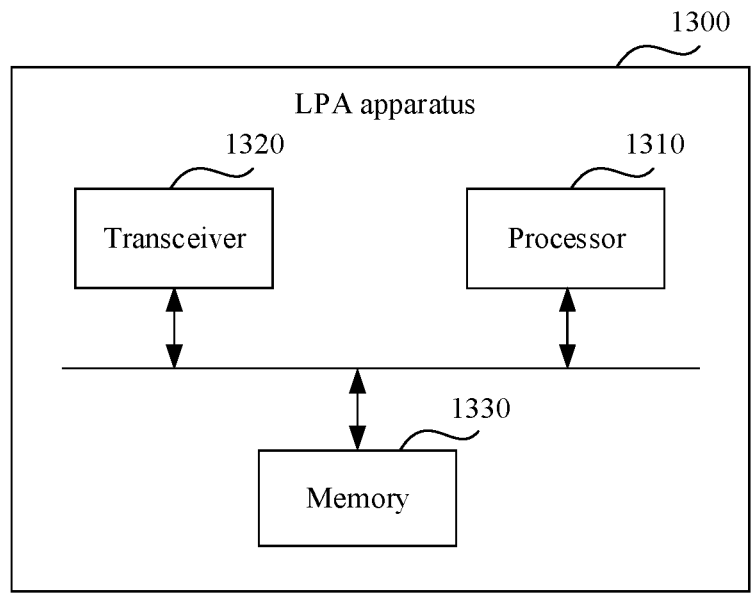
FIG. 13 is a schematic diagram of a hardware structure of a LPA apparatus according to an embodiment of the present application.

An embodiment of the present invention further includes a LPA apparatus 1300. As shown in FIG. 13, the LPA apparatus includes a processor 1310 and a transceiver 1320. Optionally, the LPA apparatus 1300 further includes a memory 1330, and the memory 1330 is configured to store a program instruction.

Wherein, the processor 1310 is configured to control the transceiver 1320 to send a subscription indication and a subscription identity to a second service provider server. The subscription indication is used to indicate the second service provider server to acquire service registration information from a first service provider server according to the subscription identity, and the service registration information is used by a first subscriber identity module card to access a first service provider network, and generate a second profile based on the service registration information.

The processor 1310 is further configured to control the transceiver 1320 to receive the second profile. The second profile is used by a terminal device to access a second service provider network.

Optionally, the processor 1310 is further configured to control the transceiver 1320 to: receive the subscription indication sent by a second service provider application, and acquire the subscription identity according to the subscription indication.

Optionally, the processor 1310 is configured to control the transceiver 1320 to send the subscription indication and the subscription identity to the second service provider server by the second service provider application.

Optionally, after the processor 1310 controls the transceiver 1320 to send the subscription indication and the subscription identity to the second service provider server, the processor 1310 controls the transceiver 1320 to acquire a verification response message. The verification response message is a response of the first subscriber identity module card to a verification request message received from the first service provider server.

The processor 1310 is configured to control the transceiver 1320 to send the verification response message to the second service provider server by the second service provider application. The verification response message is used by the first service provider server to send the service registration information to the second service provider server, after the first service provider server receives the verification response message from the second service provider server and verifies the verification response message.

Figure 14:
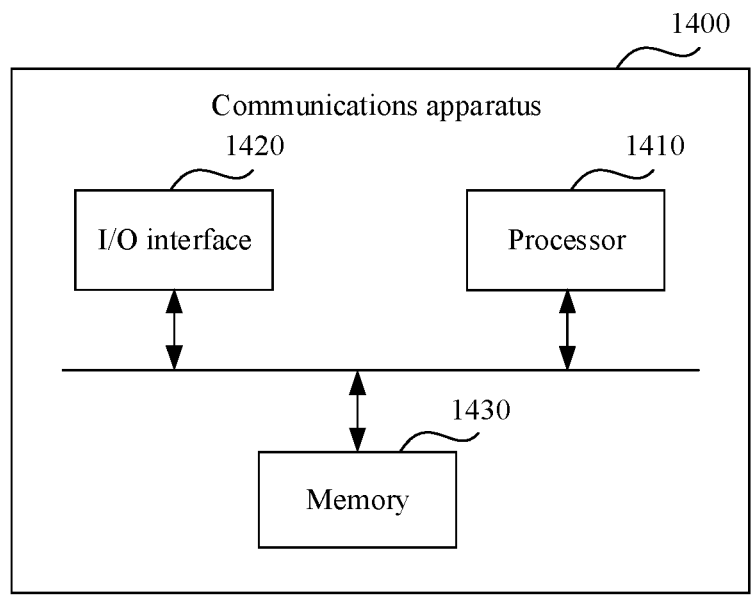
FIG. 14 is a schematic diagram of a hardware structure of a communication apparatus according to an embodiment of the present application.

FIG. 14 is a schematic diagram of a communication apparatus according to an embodiment of the present application. As shown in FIG. 14, the communication apparatus 1400 is disposed in a terminal, and for example, may be a chip disposed inside the terminal. The chip includes a processing unit and a communication unit. The processing unit may be, for example, a processor 1410, and the processor 1410 may be various types of processors described above. The communication unit may be, for example, an input/output interface 1420, a pin, or a circuit. The communication unit may include a system bus or may be connected to the system bus. Optionally, the communication apparatus further includes a storage unit. The storage unit may be a memory 1430 inside the chip, for example, a register, a cache, a random access memory (random access memory, RAM), an EEPROM, or a flash memory. The storage unit may alternatively be a memory outside the chip, and the memory may be various types of memories described above. The processor 1410 is connected to the memory 1430. The processor may execute a computer executable instruction stored in the memory, so that the communication apparatus performs functions implemented by the terminal device in the method embodiments shown in FIG. 1 to FIG. 7B.

It should be noted that all or some of the foregoing embodiments may be implemented by software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedures or functions according to the embodiments of the present application are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like. It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the specification, claims, and accompanying drawings of the present application, the terms "first", "second", "third", "fourth", and so on (if exists) are intended to distinguish between similar objects but do not necessarily indicate a specific order or sequence. It should be understood that the data termed in such a way may be changed in proper circumstances, so that the embodiments described herein can be implemented in other orders than the order illustrated or described herein. Moreover, the terms "include", "have", and any variants thereof mean to cover the non-exclusive inclusion. For example, a process, method, system, product, or device that includes a list of steps or units is not necessarily limited to those expressly listed steps or units, but may include other steps or units not expressly listed or inherent to such a process, method, system, product, or device.

In the several embodiments provided in the present application, it should be understood that the disclosed system, apparatus, and method may be implemented in other manners. For example, the described apparatus embodiment is merely an example. For example, the division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on a plurality of network units. Some or all of the units may be selected according to actual requirements to achieve the objectives of the solutions of the embodiments.

In addition, function units in the embodiments of the present application may be integrated into one processing unit, or each of the units may exist alone physically, or two or more units are integrated into one unit. The integrated unit may be implemented in a form of hardware, or may be implemented in a form of a software function unit.

In conclusion, the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A server comprising:
    a memory;
    one or more processors; and
    one or more programs stored in the memory,
    wherein the processor executes the one or more programs to facilitate:
    receiving a subscription indication and a subscription identity from a terminal device, the subscription identity comprising at least one of an identifier of a first subscriber identity module card in the terminal device and an identifier of a first profile in the first subscriber identity module card, the first subscriber identity module card accessing a first service provider network based on service registration information;
    acquiring the service registration information from a first service provider server according to the subscription indication and the subscription identity from the terminal device;
    generating a second profile according to the service registration information; and
    sending the second profile to the terminal device for accessing a second service provider network.

2. The server according to claim 1, wherein the processor executes the one or more programs to further facilitate:

sending a registration verification request to the first service provider server according to the subscription indication, the registration verification request carrying the subscription identity; and receiving the service registration information from the first service provider server, the service registration information being information from the first service provider server after the first service provider server verifies a user identity according to the subscription identity.

3. The server according to claim 1, wherein the processor executes the one or more programs to further facilitate: the sending a registration verification request to the first service provider server according to the subscription indication, the registration verification request carrying the subscription identity; and receiving the service registration information from the first service provider server, the service registration information being used by a user to access the first service provider network, and the user corresponding to the subscription identity.

4. The server according to claim 3, wherein the first service provider server is different from the server, and the first service provider network is the same as the second service provider network.

5. The server according to claim 3, wherein the first service provider server is different from the server, and the first service provider network is different from the second service provider network.

6. The server according to claim 3, wherein
the first subscriber identity module card comprises a pluggable subscriber identity module SIM card, an embedded universal integrated circuit card eUICC, an integrated universal integrated circuit card iUICC, or an integrated subscriber identity module iSIM card.

7. The server according to claim 6, wherein
the first service provider network is different from the second service provider network.

8. A terminal device, comprising:
a memory;
one or more processors; and
one or more programs stored in the memory,
wherein the processor executes the one or more programs to facilitate:
sending a subscription indication and a subscription identity to a second service provider server;
receiving a verification request message from a first service provider server;
sending a verification response message to the first service provider server, the verification response message being used by the first service provider server to send the service registration information to the second service provider server;
receiving a second profile; and
accessing a second service provider network using the second profile.

9. The terminal device according to claim 8, wherein
the subscription indication is used to indicate that the second service provider server acquires the service registration information from the first service provider server according to the subscription identity, and generates the second profile based on the service registration information; and
sending the verification response message to the first service provider server further comprises:

sending the verification response message to the first service provider server by the second service provider server.

10. The terminal device according to claim 9, wherein
the first subscriber identity module card is a pluggable subscriber identity module SIM card;
the terminal device further comprises a second subscriber identity module card, the second subscriber identity module card is an embedded universal integrated circuit card eUICC, an integrated universal integrated circuit card iUICC, or an integrated subscriber identity module iSIM card;
before sending the subscription identity to the second service provider server, the processor executes the one or more programs to further facilitate:
acquiring the subscription identity, the subscription identity comprising at least one of the identifier of the first subscriber identity module card and the identifier of the first profile in the first subscriber identity module card, the first subscriber identity module card accessing a first service provider network based on the service registration information; and
after receiving the second profile, the processor executes the one or more programs to further facilitate:
installing the second profile in the second subscriber identity module card.

11. The terminal device according to claim 9, wherein
the first subscriber identity module card is an embedded universal integrated circuit card eUICC, an integrated universal integrated circuit card iUICC, or an integrated subscriber identity module iSIM card;
the terminal device further comprises a second subscriber identity module card, the second subscriber identity module card is an embedded universal integrated circuit card eUICC, an integrated universal integrated circuit card iUICC, or an integrated subscriber identity module iSIM card;
before sending the subscription identity to the second service provider server, the processor executes the one or more programs to further facilitate:
acquiring the subscription identity, the subscription identity comprising at least one of the identifier of the first subscriber identity module card and the identifier of the first profile in the first subscriber identity module card, the first subscriber identity module card accessing a first service provider network based on the service registration information; and
after receiving the second profile, the processor executes the one or more programs to further facilitate:
installing the second profile in the first subscriber identity module card.

12. A profile generation method, comprising:
receiving, by a second service provider server, a subscription indication and a subscription identity from a terminal device, the subscription identity comprising at least one of an identifier of a first subscriber identity module card in the terminal device and an identifier of a first profile in the first subscriber identity module card, the first subscriber identity module card accessing a first service provider network based on service registration information;
acquiring, by the second service provider server, the service registration information from a first service provider server according to the subscription indication and the subscription identity; and
generating, by the second service provider server, a second profile according to the service registration information, the second profile being used by the terminal device to access a second service provider network.

13. The method according to claim 12, wherein the step of acquiring, by the second service provider server, the service registration information from the first service provider server according to the subscription indication and the subscription identity, comprises:
sending, by the second service provider server, a registration verification request to the first service provider server according to the subscription indication, the registration verification request carrying the subscription identity; and
receiving, by the second service provider server, the service registration information from the first service provider server, the service registration information being information from the first service provider server after the first service provider server verifies a user identity according to the subscription identity.

14. The method according to claim 12, wherein the step of acquiring, by the second service provider server, the service registration information from the first service provider server according to the subscription indication and the subscription identity, comprises:
sending, by the second service provider server, a registration verification request to the first service provider server according to the subscription indication, the registration verification request carrying the subscription identity; and
receiving, by the second service provider server, the service registration information from the first service provider server, the service registration information being used by a user to access the first service provider network, and the user corresponding to the subscription identity.

15. The method according to claim 14, wherein the first service provider server is different from the second service provider server, and the first service provider network is the same as the second service provider network.

16. The method according to claim 14, wherein the first service provider server is different from the second service provider server, and the first service provider network is different from the second service provider network.

17. The method according to claim 14, wherein
the first subscriber identity module card comprises a pluggable subscriber identity module SIM card, an embedded universal integrated circuit card eUICC, an integrated universal integrated circuit card iUICC, or an integrated subscriber identity module iSIM card.

18. The method according to claim 17, wherein
the first service provider network is different from the second service provider network.

19. A profile acquisition method, comprising:
sending, by a terminal device, a subscription indication and a subscription identity to a second service provider server, the terminal device including a first subscriber identity module card accessing a first service provider network based on service registration information, the subscription identity comprising at least one of an identifier of the first subscriber identity module card in the terminal device and an identifier of a first profile in the first subscriber identity module card;
receiving, by the terminal device, a verification request message from a first service provider server;
sending, by the terminal device, a verification response message to the first service provider server, the verification response message being used by the first service provider server to send the service registration information to the second service provider server; and
receiving, by the terminal device, a second profile;
accessing, by the terminal device, a second service provider network using the second profile.

20. The method according to claim 19, wherein,
the subscription indication is used to indicate that the second service provider server acquires the service registration information from the first service provider server according to the subscription identity, and generates the second profile based on the service registration information; and
the step of sending, by the terminal device, the verification response message to the first service provider server comprises:
sending, by the terminal device, the verification response message to the first service provider server by the second service provider server.

* * * * *

UNITED STATES PATENT AND TRADEMARK OFFICE
CERTIFICATE OF CORRECTION

| | | |
|---|---|---|
| PATENT NO. | : 11,363,446 B2 | Page 1 of 1 |
| APPLICATION NO. | : 16/956967 | |
| DATED | : June 14, 2022 | |
| INVENTOR(S) | : Fan et al. | |

It is certified that error appears in the above-identified patent and that said Letters Patent is hereby corrected as shown below:

In the Claims

Claim 3: Column 39, Line 12: "executes the one or more programs to further facilitate: the" should read -- executes the one or more programs to further facilitate: --.

Signed and Sealed this
Nineteenth Day of December, 2023

Katherine Kelly Vidal
*Director of the United States Patent and Trademark Office*